US009747675B2

(12) United States Patent
Shibata et al.

(10) Patent No.: US 9,747,675 B2
(45) Date of Patent: Aug. 29, 2017

(54) IMAGE PROCESSING SYSTEM

(71) Applicants: NEC Corporation, Tokyo (JP); Tokyo Institute of Technology, Tokyo (JP)

(72) Inventors: Takashi Shibata, Tokyo (JP); Shuji Senda, Tokyo (JP); Masayuki Tanaka, Tokyo (JP); Masatoshi Okutomi, Tokyo (JP); Takehito Hayami, Tokyo (JP)

(73) Assignees: NEC Corporation, Tokyo (JP); Tokyo Institute of Technology, Tokyo (JP)

( * ) Notice: Subject to any disclaimer, the term of this patent is extended or adjusted under 35 U.S.C. 154(b) by 0 days.

(21) Appl. No.: 15/036,231

(22) PCT Filed: Oct. 17, 2014

(86) PCT No.: PCT/JP2014/078282
§ 371 (c)(1),
(2) Date: May 12, 2016

(87) PCT Pub. No.: WO2015/072306
PCT Pub. Date: May 21, 2015

(65) Prior Publication Data
US 2016/0292835 A1    Oct. 6, 2016

(30) Foreign Application Priority Data

Nov. 14, 2013   (JP) .................................. 2013-235787

(51) Int. Cl.
*G06K 9/38* (2006.01)
*G06T 5/00* (2006.01)
(Continued)

(52) U.S. Cl.
CPC .............. *G06T 5/009* (2013.01); *G06T 5/008* (2013.01); *G06T 5/50* (2013.01); *H04N 1/3871* (2013.01);
(Continued)

(58) Field of Classification Search
CPC   G06T 5/009; G06T 5/008; G06T 5/50; G06T 2207/10024; G06T 2207/20208
(Continued)

(56) References Cited

U.S. PATENT DOCUMENTS

| 2008/0137153 | A1* | 6/2008 | Kunori ..................... | G06K 9/00 358/462 |
| 2008/0266610 | A1* | 10/2008 | Suzuki ............... | H04N 1/00838 358/3.28 |
| 2010/0295932 | A1* | 11/2010 | Yokomachi ............. | G06T 5/008 348/79 |

FOREIGN PATENT DOCUMENTS

| EP | 2256688 A1 | 12/2010 |
| JP | 2009-010566 A | 1/2009 |

(Continued)

OTHER PUBLICATIONS

International Search Reporting corresponding to PCT/JP2014/078282, mail date Jan. 27, 2015, 3 pages.
(Continued)

Primary Examiner — Ruiping Li
(74) Attorney, Agent, or Firm — Wilmer Cutler Pickering Hale and Dorr LLP

(57) ABSTRACT

Provided is an information processing system configured to: receive a plurality of images; select a standard image; search, in extracting partial images for complementing a too bright region/too dark region in the standard image from a reference images, using correction images obtained by subjecting each of the images to multivalued processing for each division of luminance components, for regions having matching shapes of respective regions included in the correction image of the standard image and the correction images of the other images; and complement image portions corresponding to the too bright region and/or too dark region in the correction image of the standard image using image portions, which are matching regions and correspond to appropriately bright regions, to thereby generate a synthetic image. Each image is dividable into at least three values: a (Continued)

too bright region, an appropriately bright region, and a too dark region, and has a relationship in which a boundary luminance between the too bright region and the appropriately bright region aligns with a boundary luminance between the appropriately bright region and the too dark region in a darker image having an adjacency relationship therewith.

10 Claims, 11 Drawing Sheets

(51) Int. Cl.
  *H04N 1/387* (2006.01)
  *H04N 1/407* (2006.01)
  *G06T 5/50* (2006.01)
  *H04N 5/265* (2006.01)

(52) U.S. Cl.
  CPC ........... *H04N 1/4072* (2013.01); *H04N 5/265* (2013.01); *G06T 2207/10016* (2013.01); *G06T 2207/10024* (2013.01); *G06T 2207/10144* (2013.01); *G06T 2207/20208* (2013.01); *G06T 2207/20221* (2013.01)

(58) Field of Classification Search
  USPC .......................................................... 382/271
  See application file for complete search history.

(56) References Cited

FOREIGN PATENT DOCUMENTS

| | | |
|---|---|---|
| JP | 2010-056796 A | 3/2010 |
| JP | 2010-272094 A | 12/2010 |
| JP | 2010-278890 A | 12/2010 |
| JP | 2013-093786 A | 5/2013 |

OTHER PUBLICATIONS

Written Opinion of PCT/JP2014/078282 (Partial English Translation), mail date Jan. 27, 2015, 5 pages.

Tanaka, M., et al., "Seamless Image Cloning by a Closed Form Solution of a Modified Poisson Problem," SIGGRAPH, Asia, Singapore, 1 page (Nov. 28-Dec. 1, 2012).

* cited by examiner

IMAGE PROCESSING SYSTEM

CROSS-REFERENCE TO RELATED APPLICATIONS

This application is a national stage application of International Application No. PCT/JP2014/078282 entitled "IMAGE PROCESSING SYSTEM," filed on Oct. 17, 2014, which claims the benefit of the priority of Japanese Patent Application No. 2013-235787 filed on Nov. 14, 2013, the disclosures of each of which are hereby incorporated by reference in their entirety.

TECHNICAL FIELD

This invention relates to an image processing technology, and more specifically, to an image processing system configured to use a plurality of images to obtain a desired high dynamic range image, an image synthesis processing method, a program, and a recording medium.

BACKGROUND ART

Hitherto, high dynamic range imaging (HDR) has been realized by various methods based on a plurality of images taken of the same subject.

These technologies are described in Patent Documents 1 to 3, for example.

In the method described in Patent Document 1, a plurality of input images having different exposure amounts are received, and a luminance value region in a set luminance range in each image is extracted to generate an HDR image using the region. Moreover, in the method described in the document, a plurality of luminance range set values are used to extract luminance value regions having the set values from each image and generate a large number of HDR images, and the HDR images are combined with a standard image to synthesize an HDR image to be finally output.

Also in the methods described in Patent Documents 2 and 3, processing operation is performed so that a plurality of input images are received, and a desired region is extracted from each input image to fill a too bright region and a too dark region in a standard image. In the method in Patent Document 2, a plurality of input images taken under the same image pickup conditions are acquired, and the input images are superimposed on each other by subjecting luminances in the same pixel portion to addition processing to obtain an HDR image. Moreover, in the method in Patent Document 3, an image pickup unit having a special structure is used to acquire a plurality of input images taken under different exposure conditions, each image is normalized and evaluated for reliability, and the images are synthesized in accordance with the reliability to obtain an HDR image.

In Non Patent Document 1, a Poisson synthesis method, which may be adopted in embodiments to be described below, is described.

PRIOR ART DOCUMENTS

Patent Document

Patent Document 1: JP-A-2010-278890
Patent Document 2: JP-A-2010-056796
Patent Document 3: JP-A-2013-093786

Non Patent Document

Non Patent Document 1: M. Tanaka, R. Kamio, and M. Okutomi, "Seamless image cloning by a closed form solution of a modified Poisson problem," in SIGGRAPH ASIA Posters' 12, 2012, pp. 15-15.

SUMMARY OF THE INVENTION

Problems to be Solved by the Invention

As described above, various approaches are taken to generate a high dynamic range image. In many methods, in synthesizing an HDR image, the same image pickup element is used to acquire a plurality of images with different exposure amounts under conditions of the same angle of field and the same focal length, and the set of images are synthesized into the HDR image.

Alternatively, in synthesizing an HDR image, different image pickup elements are used to acquire a plurality of images with different exposure amounts under conditions of substantially the same angle of field and substantially the same focal length, and the set of images are synthesized into the HDR image.

However, several problems are found in those methods.

To exemplify one problem, in obtaining a plurality of images to be synthesized, the above-mentioned conditions need to be satisfied.

More specifically, in order to obtain the plurality of images by using one image pickup element, there arises a need to take images at different times. As a result, a good result cannot be obtained in image synthesis with a moving object being a subject. Moreover, as the number of images with different exposure amounts for use in the synthesis is increased, a time interval is increased, and satisfying the photographic conditions tends to become difficult.

On the other hand, when the different image pickup elements are used, the plurality of images may be obtained roughly at the same time with as small a difference as the exposure time, but there arises a need to take images while strictly managing the photographic conditions such as the same angle of field and the same focal length. As a result, there arises a need for a function of coordinating the image pickup elements and an optical system as needed.

When the method described in Patent Document 1 is examined from the above-mentioned perspective, a weakness is found in obtaining the input image group from the same image pickup element while gradually changing the exposure amount or an aperture. Therefore, during the photography, there arises a need to use an instrument such as a tripod for fixing an image pickup apparatus so as not to include different positional relationships.

Also in the method described in Patent Document 2, there is a weakness in obtaining the input image group from the same image pickup element. Moreover, the plurality of input images are acquired under the same image pickup conditions, and hence portions in which a blocked-up shadow and a blown-out highlight occur under the image pickup conditions are not complemented in the image processing in the document.

Further in the method described in Patent Document 3, there is a weakness in sequentially obtaining the input images in synchronization by non-destructive reading from the image pickup unit. In other words, the image pickup conditions are limited in many ways.

Moreover, in addition to resolving the exemplified limitations on the image pickup conditions, a method of creating a better HDR image is sought for.

In view of the above, this invention provides an image processing system configured to obtain a good high dynamic range image from a plurality of images having different luminance components even when different image pickup factors are included.

Means to Solve the Problem

According to one embodiment of this invention, there is provided an image processing system, including: an image reception unit configured to receive a plurality of images having different luminance components as input images; a standard image selection unit configured to select a standard image from among the plurality of images; a region-to-be-complemented search unit configured to perform, in extracting partial images for complementing a too bright region and/or too dark region in the standard image using other images of the plurality of images as reference images from the reference images, processing of searching, using correction images obtained by subjecting each of the input images to multivalued processing for each division of the luminance components, for regions having matching shapes using shapes of dividable regions included in the correction image of the standard image and shapes of dividable regions included in the correction images of the other images; a complementary processing unit configured to subject image portions corresponding to the too bright region and/or too dark region in the correction image of the standard image to complementary processing using image portions, which are matching regions in the reference images and correspond to appropriately bright regions in each of the reference images, to thereby generate a synthetic image; and an output unit configured to output the generated synthetic image, in which, as the input images, each image is dividable into at least three values: a too bright region, an appropriately bright region, and a too dark region, and an image group having a luminance component relationship in which a boundary luminance between the too bright region and the appropriately bright region of luminance components in each image aligns with a boundary luminance between the appropriately bright region and the too dark region in a darker image having an adjacency relationship therewith in terms of luminance is used.

According to one embodiment of this invention, there is provided an image processing method using an information processing system, including: receiving a plurality of images having different luminance components as input images; selecting a standard image from among the plurality of images; performing, in extracting partial images for complementing a too bright region and/or too dark region in the standard image using other images in the plurality of images as reference images from the reference images, processing of searching, using correction images obtained by subjecting each of the input images to multivalued processing for each division of luminance components, for regions having matching shapes using shapes of dividable regions included in the correction image of the standard image and shapes of dividable regions included in the correction images of the other images; and subjecting image portions corresponding to the too bright region and/or too dark region in the correction image of the standard image to complementary processing using image portions, which are matching regions in the reference images and correspond to appropriately bright regions in each of the reference images, to thereby generate a synthetic image, in which, as the input images, each image is dividable into at least three values: a too bright region, an appropriately bright region, and a too dark region, and an image group having a luminance component relationship in which a boundary luminance between the too bright region and the appropriately bright region of the luminance components in each image aligns with a boundary luminance between the appropriately bright region and the too dark region in a darker image having an adjacency relationship therewith in terms of luminance is used.

According to one embodiment of this invention, there is provided a computer-readable recording medium having non-temporarily recorded thereon a program for causing an information processing system to operate as: an image reception unit configured to receive a plurality of images having different luminance components as input images; a standard image selection unit configured to select a standard image from among the plurality of images; a region-to-be-complemented search unit configured to perform, in extracting partial images for complementing a too bright region and/or too dark region in the standard image using other images in the plurality of images as reference images from the reference images, processing of searching, using correction images obtained by subjecting each of the input images to multivalued processing for each division of luminance components, for regions having matching shapes using shapes of dividable regions included in the correction image of the standard image and shapes of dividable regions included in the correction images of the other images; a complementary processing unit configured to subject image portions corresponding to the too bright region and/or too dark region in the correction image of the standard image to complementary processing using image portions, which are matching regions in the reference images and correspond to appropriately bright regions in each of the reference images, to thereby generate a synthetic image; and an output unit configured to output the generated synthetic image, in which, as conditions for the input images, each image is dividable into at least three values: a bright region, an appropriately bright region, and a dark region, and an image group having a luminance component relationship in which a boundary luminance between the bright region and the appropriately bright region of luminance components in each image aligns with a boundary luminance between the appropriately bright region and the dark region in a darker image having an adjacency relationship therewith in terms of luminance is used.

Effect of the Invention

According to this invention, there can be provided the image processing system configured to obtain a good high dynamic range image from the plurality of images having different luminance components even when different image pickup factors are included.

MODES FOR EMBODYING THE INVENTION

Now, embodiments of this invention are described with reference to the drawings.

First Embodiment

Figure 1:
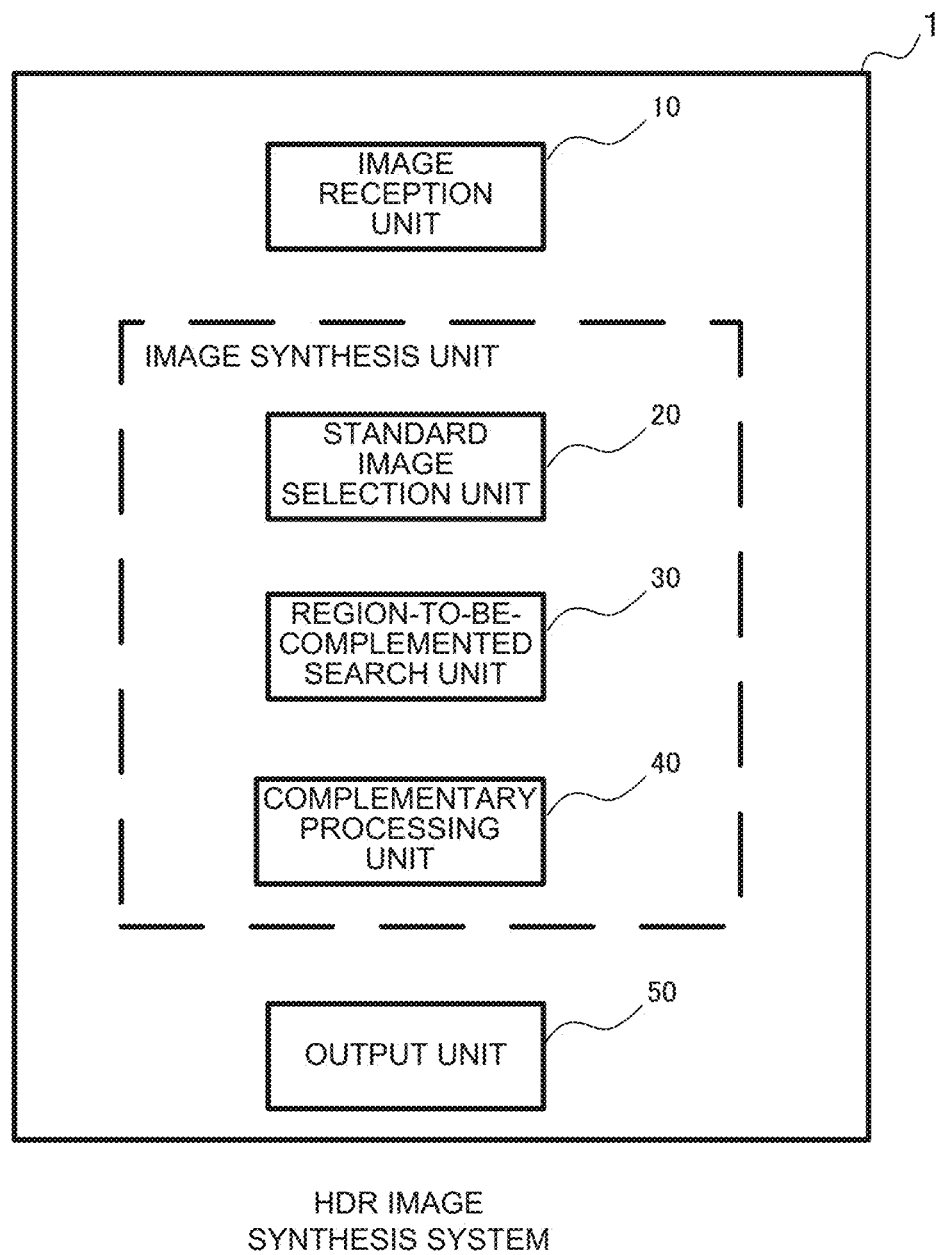
FIG. 1 is a block diagram for illustrating an HDR image synthesis system according to a first embodiment of this invention.

FIG. 1 is a block diagram for illustrating an HDR image synthesis system 1 according to a first embodiment of this invention.

The HDR image synthesis system 1 according to the first embodiment includes an image reception unit 10, and a standard image selection unit 20, a region-to-be-completed search unit 30, and a complementary processing unit 40, which are configured to operate as image synthesis means, as well as an output unit 50.

The image reception unit 10 receives a plurality of images having different luminance components as input images. The input images may be prepared by setting different exposure conditions to acquire the plurality of images, for example.

Note that, processing operation in which a luminance component is used to perform image synthesis is described below, but this invention is not limited thereto. For example, instead of using a Y component (luminance component) in a YUV color space, a V component (brightness component) in an HSV color space may be used to perform similar image synthesis. More specifically, a maximum value of brightness in an RGB color space may be defined instead of the luminance component, and the following image synthesis processing may be performed with the value.

As the images to be received as the input images, an image group acquired so that features of an image pickup subject are expressed in terms of luminance is used. Each of the images is prepared so as to be dividable into at least three values: a too bright region, an appropriately bright region, and a too dark region, and to have a luminance component relationship in which a boundary luminance between the too bright region and the appropriately bright region of the luminance components in each image aligns with a boundary luminance between the appropriately bright region and the too dark region in a darker image having an adjacency relationship therewith in terms of luminance.

Ranges of division with the luminance components in the respective images are reflected on correction images to be described later.

The standard image selection unit 20 is configured to select a standard image from among the input images. The standard image may be obtained by selecting one image from among the input images by an arbitrary method. Moreover, image selection by a person may be received. Moreover, amounts of the ranges of division in the correction images may be compared to set the standard image. For example, in the case of the three-value division, the selection processing may be performed so that an image in which the appropriately bright region occupies the largest area is set as the standard image. It is also possible not to select an image including a predetermined amount or more of the too bright region/too dark region as the standard image. Moreover, specification of an arbitrary range in an image may be received to set an image in which the appropriately bright region has the largest area in the specified range among the images as the standard image.

The region-to-be-completed search unit 30 is configured to refer to the correction images that have been subjected to multivalued processing for each luminance component division of each image, set the remaining images as reference images with respect to the standard image, and compare shapes of the dividable regions included in the correction images to derive matching regional portions among images with the shapes formed by the regions that have been successfully divided.

The correction images used in this processing are images obtained by subjecting the input images to the multivalued processing for each division of the luminance components. The correction images may be taken in from the image reception unit 10 along with the input images as corresponding correction images, or may be generated in an image synthesis unit. For example, the correction images may be generated by the standard image selection unit 20 as in a processing example to be described later.

In the correction images, the ranges of division with the luminance components of the images are expressed. When the ranges of division have three values, contents of each of the correction images are categorized into the three divisions: the too bright region, the appropriately bright region, and the too dark region.

The too bright region corresponds to a region including a so-called "blown-out highlight" region, in which luminances are higher than a predetermined standard value.

Moreover, the too dark region corresponds to a region including a so-called "blocked-up shadow" region, in which luminances are lower than a predetermined standard value.

The appropriately bright region refers to all between the too bright region and the too dark region.

The predetermined standards of the images correspond to the boundary luminances of the too bright region, the appropriately bright region, and the too dark region. The thresholds are set in a stepwise manner between the images having an adjacency relationship in terms of luminance so as to encompass desired luminances for many scenes.

When three-valued images are used as the correction images, the thresholds are set to the images so that the boundary luminance between the too bright region and the appropriately bright region of the luminance components in each image aligns with the boundary luminance between the appropriately bright region and the too dark region in the darker image having the adjacency relationship therewith in terms of luminance.

Moreover, an upper limit and a lower limit of each of boundary luminance regions between the too bright region and the appropriately bright region and between the appropriately bright region and the too dark region may be defined as the thresholds for conversion into five values, and the five-valued images may be used as the correction images. When the five-valued images are used as the correction images, it becomes easy to align with the boundary luminance between the appropriately bright region and the too dark region in the darker image having the adjacency relationship in terms of luminance. In other words, it becomes easy to acquire the image group to be received as the input images. For example, when images are taken with a plurality of cameras, a margin is generated in settings for each camera. Moreover, a luminance range within the thresholds of the upper limit and the lower limit of each image may be treated as being included in both brightness regions to impart ambiguity to mapping processing of the shapes of the regions by the region-to-be-completed search unit 30. As a result, appearance of an HDR image is improved.

Moreover, multivalued images such as seven-valued images may be used to further improve position adjustment accuracy in the mapping processing of the shapes of the regions, or regions to be complemented in the standard image may be replaced or synthesized by more appropriately bright regions in the reference images.

The complementary processing unit 40 is configured to subject image portions in an original image, which correspond to the too bright region and/or the too dark region in the correction image of the standard image, to complementary processing using image portions, which are matching regions in the reference images and correspond to the appropriately bright region in the reference images.

In the complementary processing, for example, when the too dark region/too bright region in the standard image is replaced by a corresponding partial image (image of matching region) in the reference image or synthesized with images in mutual regions, the too dark/too bright portion in the standard image is complemented to be easily visible in terms of luminance.

At this time, as a part of the complementary processing, matching image portions in the reference images may be corrected for size and pixel arrangement angle due to a difference in image pickup position when/after the partial images are extracted. With this correction, for example, a difference in number of image pickup pixels, a difference in acquisition resolution, a difference in image pickup angle, and the like among the image pickup elements may be absorbed. The difference in pixel pickup position and angle may be adjusted based on the shape of the subject captured in the image, or by acquiring and using, as known information, a positional relationship among the image pickup elements, an image pickup time relationship among the images, and the like when the images are taken. This correction may be performed by using any method.

The complementary processing on the standard image is performed repeatedly for each of the reference images. As a result, an HDR image with an increased visible range is formed.

The repetition of the complementary processing may be performed efficiently by repeating for the image portions corresponding to the too bright region and/or too dark region, which needs to be complemented in the selected standard image, in order from a reference image close to the standard image in terms of luminance to a reference image farther from the reference image.

Moreover, a mechanism in which, when there is no more region to be complemented, the complementary processing is stopped from being repeated in the direction (the direction of the too bright region or the direction of the too dark region) may be provided.

Through the repetition of the complementary processing, a good HDR image may be obtained also when repeating for the image portions corresponding to the too bright region and/or the too dark region, which need to be complemented in the selected standard image, in order from a reference image farthest from the standard image in terms of luminance to a reference image closer to the standard image.

Note that, as a method of performing the complementary processing, in the above-mentioned method, the method in which only the luminance values of the images themselves are used to perform the complementary processing has been described, but this invention is not limited thereto. For example, in performing the complementary processing, not only the luminance values of the images themselves but also luminance gradient values of the images may be used to perform the complementary processing. More specifically, for example, two types of images: an image obtained by complementing values of the luminance values in the standard image, and an image obtained by complementing the luminance gradient values in the standard image may be generated, and these images may be used to synthesize an image using Poisson synthesis. As a method in which the Poisson synthesis is used, the method described in Non Patent Document 1 may be used, for example.

Moreover, a configuration in which each partial image, which is acquired from the reference images and is to be reflected on the standard image, is subjected to luminance adjustment processing based on luminances of the standard image may be adopted.

The above-mentioned processes may be used in combination as appropriate. For example, the partial images of the regions that have been subjected to the luminance adjustment may be complemented so as to be superimposed on the image portions corresponding to the too bright region and/or too dark region in the standard image in order from a partial image obtained from the reference image that is close thereto in terms of luminance while leaving a portion of the appropriately bright region. The output unit 50 is configured to output the generated HDR image in a required form to a storage unit or a display unit. Moreover, the standard image may also be output along with the generated HDR image.

With the above-mentioned configuration, even when different image pickup factors (for example, relationship in which the positional relationship, temporal relationship, or synchronous relationship in image taking is variable) are included, a good high dynamic range image may be obtained from the plurality of images having the different luminance components.

[Image Processing Flow]

Next, HDR image synthesis processing is described.

Figure 2:
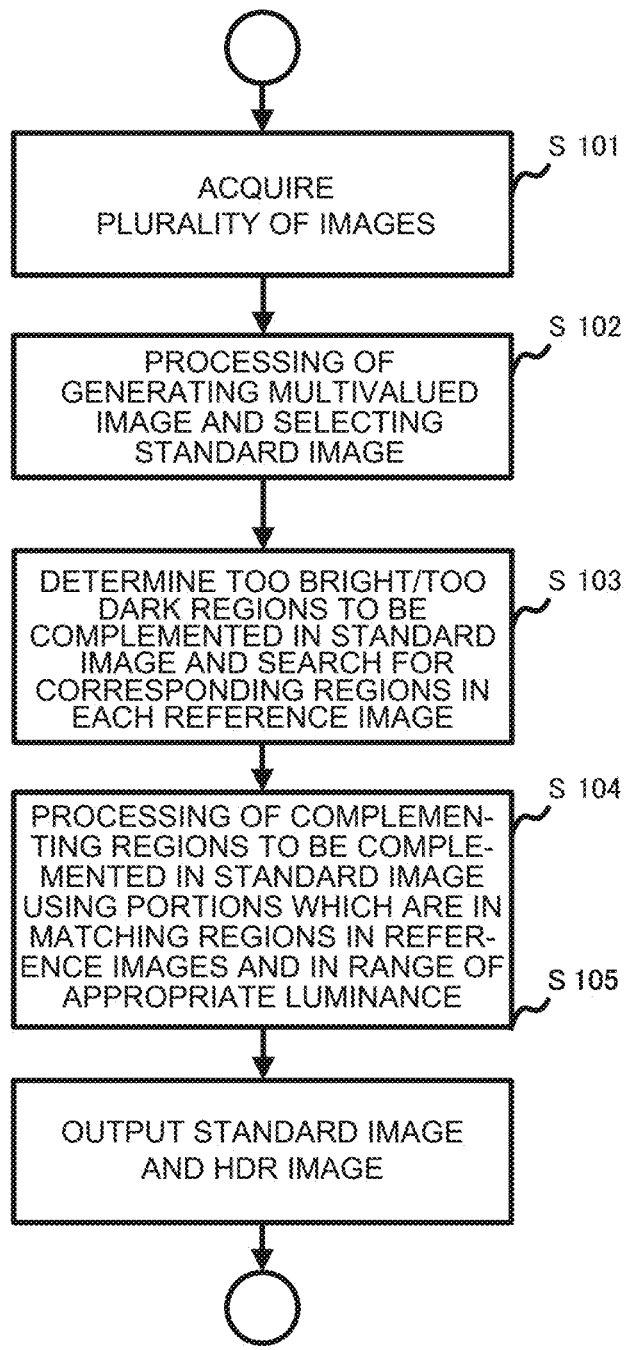
FIG. 2 is a flow chart for illustrating processing operation performed in the HDR image synthesis system according to the first embodiment.

In FIG. 2, an example of a flow of the image processing performed in the HDR image synthesis system 1 is illustrated. Note that, this processing flow and processing flows to be described later are merely examples, and interchange of the order of processing, a method of repeating each process, a system to be applied to each process, the number of images to be processed, and the like may be read to be changed appropriately as needed.

The image reception unit 10 acquires the plurality of images, which serve as the standard image and the reference images to be described later, as the input images (S101).

In this image synthesis processing, five images are received as the input images. These five images are acquired or processed so that the adjacency relationship is established for the luminance component relationship when each image is divided in terms of luminance. The luminance component relationship of the image group is described later in isolation.

Next, the standard image selection unit 20 divides depiction of each image into at least three regions: the too bright region, the appropriately bright region, and the too dark region for each of the luminance components to generate images expressing respective regions as the correction images of the respective images (S102-1).

Next, the standard image selection unit 20 selects an image in which the appropriately bright region has the largest area from among the images, and sets the image as the standard image (S102-2).

Next, the region-to-be-completed search unit 30 identifies each of the too bright region and the too dark region in the standard image as a region to be complemented (S103-1). The too bright region and the too dark region may be easily acquired by referring to the correction images of the images that have been subjected to the multivalued processing.

Next, the region-to-be-completed search unit 30 derives corresponding regions in the reference images, which correspond to the regions to be complemented in the standard image, by comparing shapes of ranges (shapes of regions that have been successfully divided) that are continuous in terms of luminance divisions included in the correction images (S103-2). Note that, the five-valued or higher multivalued images may be used to impart ambiguities to the boundary luminance ranges and hence to improve robustness of the mapping.

Next, the complementary processing unit 40 subjects the regions to be complemented (too bright region and too dark region) in the standard image to the complementary processing by utilizing image portions corresponding to the appropriately bright region in the regions that have been successfully matched in the reference images (S104). At this time, the complementary processing may be repeated on each of the too bright region and the too dark region in the standard image for each reference image. Moreover, which of images acquired from different reference images of the same region is to be adopted may be identified by image analysis. At this time, image portions having a large appropriately bright region may be given preference, or whether a change in luminance from an end of the corresponding region in the standard image is large/small, too large/too small, or the like may be taken into consideration.

Note that, the repetition of the complementary processing may be performed efficiently by repeating the individual image portions corresponding to the regions to be complemented in the selected standard image in order from the reference image close to the standard image in terms of luminance to the reference image farther from the standard image until the regions to be complemented are completely filled.

Alternatively, the repetition of the complementary processing may be performed efficiently by repeating the individual image portions corresponding to the regions to be complemented in the selected standard image in order from the reference image farthest from the standard image in terms of luminance to the reference image closer to the standard image until the regions to be complemented are completely filled.

Which order of the above-mentioned processes is to be adopted generates a difference in appearance of the generated HDR image, and hence a mechanism to prompt a user to select may be provided. Moreover, a different algorithm may be used for each of the too bright region and the too dark region to be complemented. For example, the reference may be made in order from the closer reference image for the too bright region, and the reference is made in order from the farthest reference image for the too dark region.

Moreover, selection of a subject may be received from the user to change an algorithm to be adopted, for example.

Next, the output unit 50 outputs the selected standard image and the generated HDR image to the storage unit and the display unit (S105). The HDR images may be generated by a plurality of types of algorithms and may be displayed simultaneously.

The above-mentioned processing operation is performed to complement regions that are hardly visible in terms of luminance in the selected standard image from the plurality of images and hence to obtain a good HDR image.

Now, the luminance component relationship of the input images (image group) is described.

Figure 3:
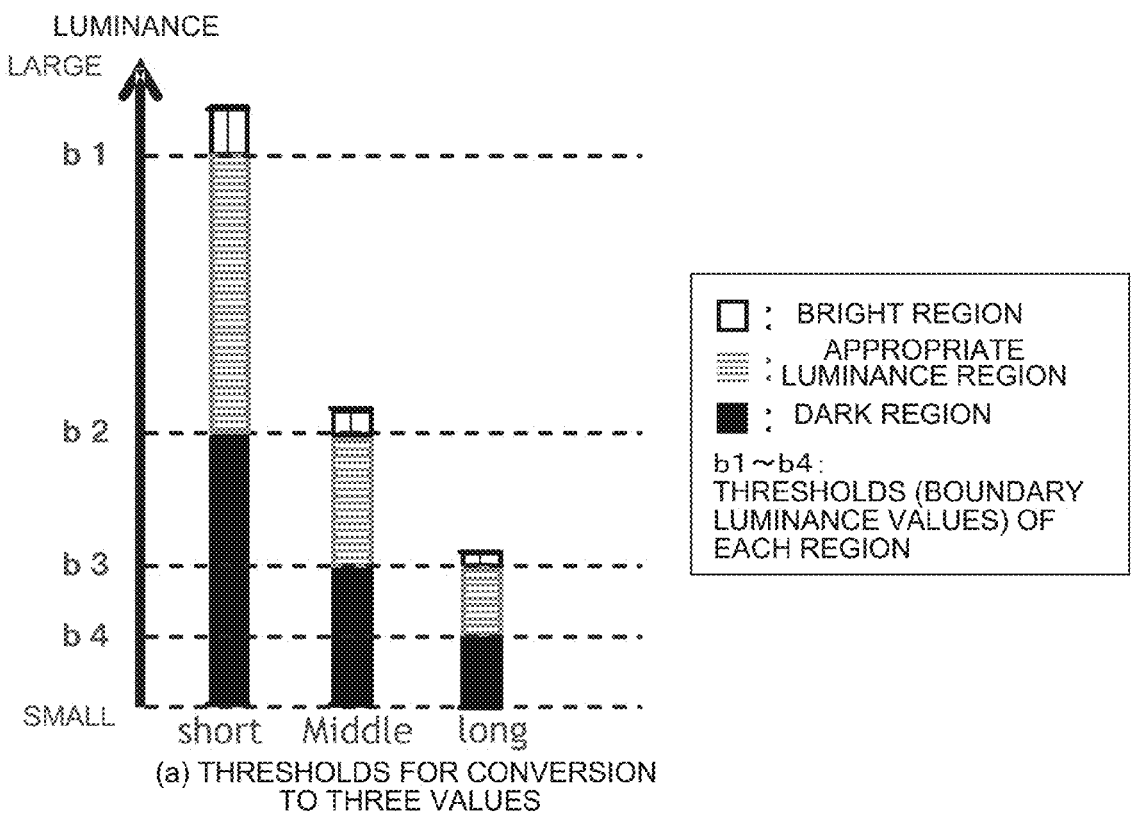
FIG. 3 is an explanatory graph for showing a luminance component relationship and thresholds set to input images, in which Part (a) exemplifies thresholds for conversion to three values, and Part (b) exemplifies thresholds for conversion to five values.
Figure 3:
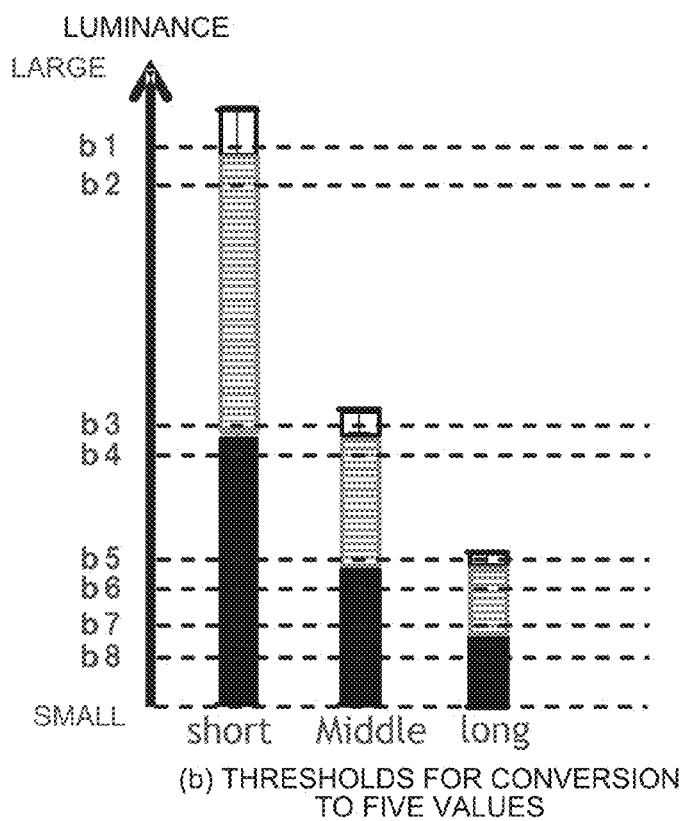

FIG. 3 is an explanatory graph for showing the luminance component relationship set among images used as the input images. In Part (a) of FIG. 3, the number of input images is "3", and the number of divisions in terms of luminance is also shown as "3". In other words, a luminance component relationship of three three-valued correction images is shown.

In the explanatory graph, "long", "middle", and "short" indicate images taken with different exposure time, and "short" is the darkest image. The three images may be images differentiated in luminance using, in addition to the exposure time, a difference in ISO sensitivity of the image pickup elements or image processing, for example. This combination may be established by making adjustment of the exposure conditions and the like so that the respective images depict different appropriate luminance regions.

Each image is divided for each of the thresholds set to three regions: a bright region, an appropriately bright region, and a dark region.

Moreover, the thresholds are set so that a boundary luminance (threshold) between the bright region and the appropriately bright region in each image aligns with a boundary luminance (threshold) between the appropriately bright region and the dark region in a darker image having an adjacency relationship therewith in terms of luminance.

For example, a boundary luminance (threshold b3) between the bright region and the appropriately bright region in the image "long" in the explanatory graph is set to align with a boundary luminance (threshold b3) between the appropriately bright region and the dark region in the image "middle" having an adjacency relationship therewith in terms of luminance.

The image "middle" and the image "short" has a similar relationship, and the boundary luminances are set to align at a threshold b2. If a still darker image is acquired, the image is acquired with settings in which its boundary luminance aligns with the boundary luminance of the image "short" at a threshold b1.

In Part (b) of FIG. 3, the number of input images is "3", and the number of divisions in terms of luminance is shown as "5". In other words, a luminance component relationship of three five-valued correction images is shown. Buffer regions in terms of luminance are set as an upper value and a lower value using thresholds between the bright region and the appropriately bright region and between the appropriately bright region and the dark region of each image.

Based on the number of divisions given to the thus-generated correction images, the input images are prepared.

Such input images may be used in the image synthesis processing to obtain the good high dynamic range image from the plurality of images having the different luminance components.

[Processing Example]

Next, a processing operation example of this invention is described with the use of image processing results. In order to simplify the description, the number of input images is three, and the correction images are obtained by three-valued processing.

Figure 4:
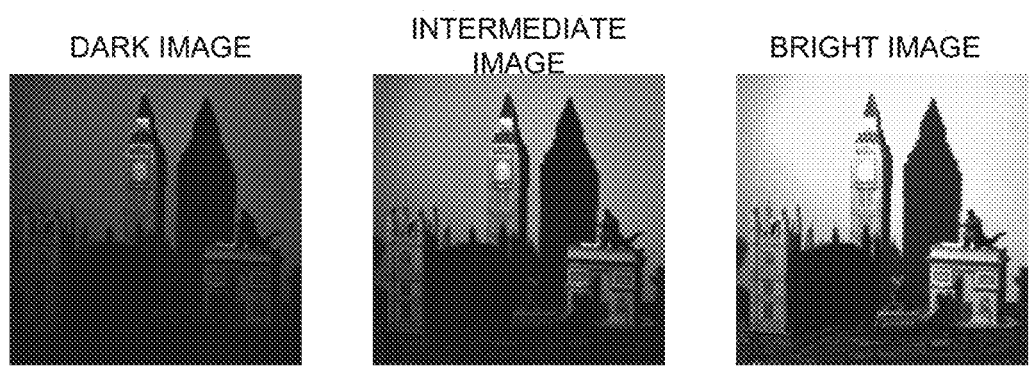
FIG. 4 is a diagram for showing three input images used for describing operation.

In FIG. 4, three input images are shown. These three images are synthesized.

The images correspond to a bright image, a dark image, and an intermediate image. The images have the luminance component relationship in which the boundary luminances when converted to three values align as described above.

The HDR image synthesis system 1 receives the three images as the input images, and selects the standard image. In this example, the intermediate image is selected as the standard image, and the remaining two images are set as the reference images.

Figure 5:
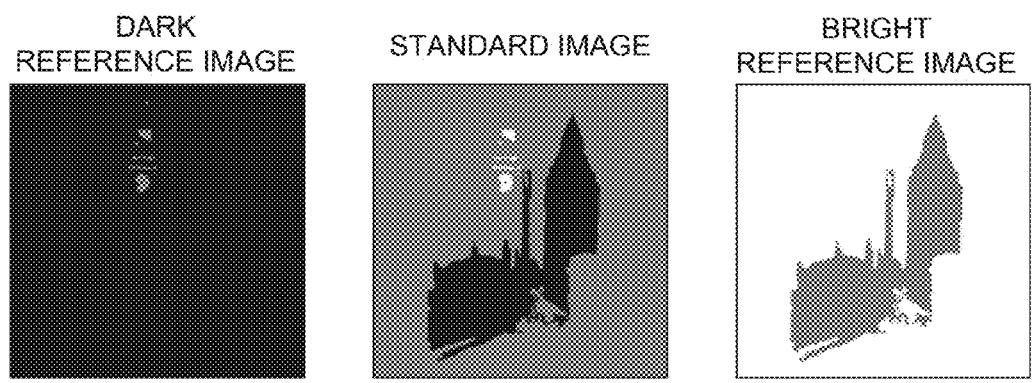
FIG. 5 is a diagram for showing images obtained by converting the input images shown in FIG. 4 into three values.
Figure 5:

The HDR image synthesis system 1 prepares three-valued images (correction images) of the respective images. In FIG. 5, three-valued images of the input images shown in FIG. 4 are shown. Note that, in this description, images having the same angle of field are used, but images acquired with vertically or horizontally different angles of field may also be synthesized, for example. Note that, in the case of the five-valued images, each of the boundaries appearing in FIG. 5 is constituted of two thresholds (upper limit and lower limit).

Next, the HDR image synthesis system 1 refers to the correction image of the standard image to identify regions to be complemented (too bright region and too dark region).

Note that, in the example of FIG. 5, in the correction image of the standard image, a "group of regions of a part of the clock tower" and "regions of shadows of constructions" may be identified as the too bright region and the too dark region, respectively. Moreover, the dark reference image has no too bright region, resulting in a two-value image. Similarly, a bright reference image has no too bright region, resulting in a two-value image. Meanwhile, it can be seen that there is little region of appropriate luminance in the bright reference image and the dark reference image.

Next, in order to use the partial images in the reference images as images of the regions to be complemented in the standard image, the HDR image synthesis system 1 extracts shapes of dividable regions included in the correction images. The regions extracted from the correction images may be subjected to smoothing processing for the shapes.

Next, the extracted shapes of the dividable regions included in the correction image of the standard image are compared with shapes of dividable regions included in the correction images of the reference images to search for matching regions. In the matching processing, for example, a shape of each of the "group of regions of a part of the clock tower" identified by the three-value image as the too bright region in the standard image is searched for from within the correction image of the dark reference image. Similarly, the "regions of the shadows of the constructions" identified by the three-value image as the too dark region in the standard image are searched for from within the correction image of the bright reference image.

Figure 6:
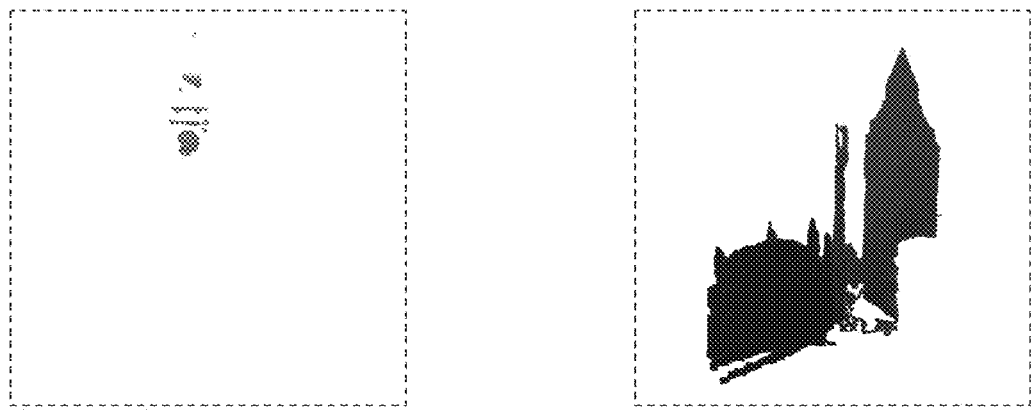
FIG. 6 is a diagram for showing image portions corresponding to a too bright region and a too dark region in a standard image extracted from reference images shown in FIG. 4.

In FIG. 6, image portions extracted from the reference images as regions corresponding to the too bright region and the too dark region in the standard image from the reference images shown in FIG. 4 are shown. These images have the above-mentioned features in terms of luminance of the images, and hence a larger portion corresponding to the appropriately bright region is included than that in the standard image.

In the above-mentioned search processing, the image portions of the too bright region and/or too dark region in the correction image of the standard image are subjected to the complementary processing using the partial images of the matching regions in the reference images.

In the description of this processing example, three images are used, and hence when the intermediate image is selected as the standard image, each of the too bright region and the too dark region is subjected once to the complementary processing. On the other hand, when the dark reference image shown in FIG. 4 is selected, the too dark region thereof may be subjected twice to the complementary processing respectively using the intermediate image and the bright image.

The complementary processing is repeated as appropriate to generate a better high dynamic range synthesis image.

Figure 7:
FIG. 7 is a diagram for showing an image obtained by incorporating the image portions shown in FIG. 6 into the standard image.

In FIG. 7, an image obtained by incorporating the image portions to be combined with the regions to be complemented, which are shown in FIG. 6, into the standard image is shown.

Figure 8:
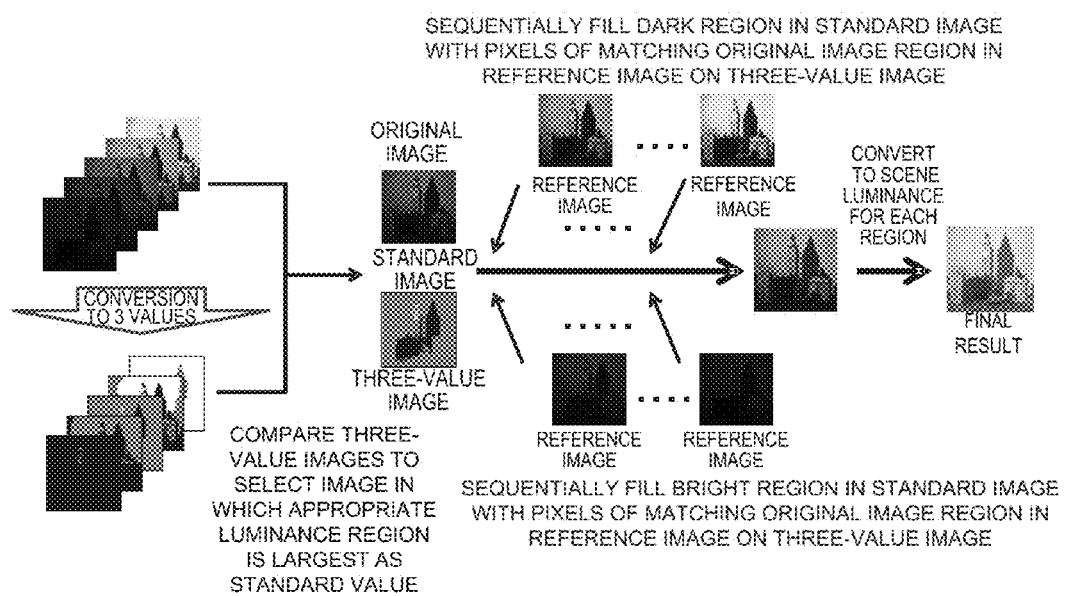
FIG. 8 is a conceptual diagram for illustrating HDR imaging with five input images.
Figure 9:
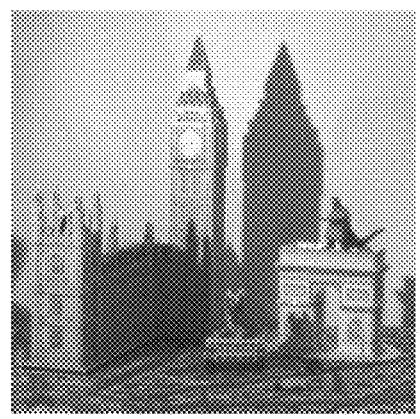
FIG. 9 is a diagram for showing a synthetic image obtained by the HDR imaging illustrated in FIG. 8.

FIG. 8 and FIG. 9 are a conceptual diagram for illustrating HDR imaging with five input images and a synthetic image obtained by the HDR imaging, respectively.

In this image synthesis processing, the image portion corresponding to the too bright region or the too dark region in the correction image of the standard image is first subjected to the complementary processing with an image that is adjacent thereto in terms of luminance, and an image as a complement result is further subjected to the complementary processing using the remaining reference images one by one.

In the synthetic image as a final result, the image portions corresponding to the appropriately bright regions in the reference images remain accumulatively.

Moreover, when a part of the reference images is incorporated as a part of the synthetic image, the luminance adjustment is performed on the side of the reference images to match the standard image.

As a result, in the synthetic image, the detailed structure of the clock tower and colors and textures of buildings hidden in the shadows in the standard image can be identified by a person.

Next, a method of optimizing the processing of matching the regions, which is performed by the region-to-be-complemented search unit 30, is described. In the above description, the matching by comparing the shapes of each luminance region in the multivalued images has been described. This processing of matching between the shapes may be changed to matching processing in which an image content (pixel content) in each region is reflected using the cost function (1) provided below. With this method, more robust search accuracy is realized.

$$E_\Omega(p) = E_{shape}(p) + \alpha E_{texture}(p) \tag{1}$$

$E_\Omega(p)$ is a total matching cost of individual luminance region shapes.

$E_{shape}(p)$ is a part of the cost function for searching with exclusive disjunction, and is expressed by the expression (2) provided below, for example.

On the other hand, $E_{texture}(p)$ is a part of the cost function for searching with weighted SSD, and is expressed by the expression (3) provided below, for example.

Moreover, a is a weight variable for operating a balance of the two cost functions.

$$E_{shape}(p) = \frac{1}{|\Omega'|} \sum_{x \in \Omega'} triB(x) \otimes triR(x+p) \quad (2)$$

$$E_{texture}(p) = \frac{1}{|\Omega|} \sum_{x \in \Omega} w(B(x))(B(x) - R(x+p))^2 \quad (3)$$

The above-mentioned cost function (1) is used to determine a difference in shape with exclusive disjunction of the two-value images and determine a difference in texture with a sum of squared distance (SSD) of pixel values, with the result that an appropriate search result may be determined.

The matching processing using the above-mentioned cost function may be adopted to perform processing in which both of the difference in shape and the difference in texture are taken into consideration.

Moreover, the weight α may be adjusted to adjust which of the difference in shape and the difference in texture is to be given greater importance. When α=0, the matching is performed using only the difference in shape, when α=1, the matching is performed with balanced importance of the difference in shape and the difference in texture, and as a becomes larger, the difference in texture is given greater importance.

For example, when there is a large difference in brightness among the plurality of input images, texture matching is difficult, and hence it is desired to adopt a (small value) that gives importance to the difference in shape, and it is desired to adopt a (large value) that also takes the difference in texture into consideration otherwise.

Note that, the notation of the mathematical expression of the cost function (1) is merely an example. Moreover, the position of each variable (position of α or the like) in the mathematical expression is not limited to the above-mentioned example.

Alternatively, as a modified example of the cost function (1), a smoothness term regarding a shift p of each luminance region shape may be introduced. More specifically, the smoothness term may be designed to have a smaller value as the shift of each luminance region shape becomes more equivalent as in the following expression (4), for example.

$$E(p_1, \ldots, p_N) = \sum_{k=1}^{N} |\Omega_k| \quad (4)$$

$$(E_{shape}(p_k) + \alpha E_{texture}(p_k)) + \lambda \sum_{(i,j) \in E} w_d(\Omega_i, \Omega_j) \| p_i - p_j \|^2$$

Note that, the sum of costs may be taken here for all pairs of each luminance region shape. Moreover, λ is a parameter indicating the magnitude of the smoothness term. Moreover, $\omega_d(\Omega_i, \Omega_j)$ is a weight for adjusting the strength of the smoothness term of a luminance region shape i and a luminance region shape j. For example, the weight coefficient may be designed to have a smaller value as a distance between centers of gravity of the luminance region shape i and the luminance region shape j becomes larger.

Note that, in the description mentioned above, the smoothness term is designed so that each shift of each luminance region tends to be smooth in special domain. In our invention, the smoothness term can be also designed so that each shift of each luminance region tends to be smooth in the temporal domain.

Note that, as a method of optimizing the expression (4), for example, the following repetition processing may be performed. First, the shift p is calculated independently using the expression (1) for each of the luminance region shapes. Next, processing of fixing a value of a shift of a shape other than an arbitrarily selected luminance region shape (for example, j), and determining only the shift of the selected luminance region shape is determined using the expression (4) is repeated a plurality of times. When a change in value of the expression (4) becomes sufficiently small through the repetition processing, the repetition processing is ended, and the obtained shift p is treated as an approximate optimal solution of the expression (4).

Next, an example of processing of generating the input images and an example of processing of complementing each region are described.

Figure 10:
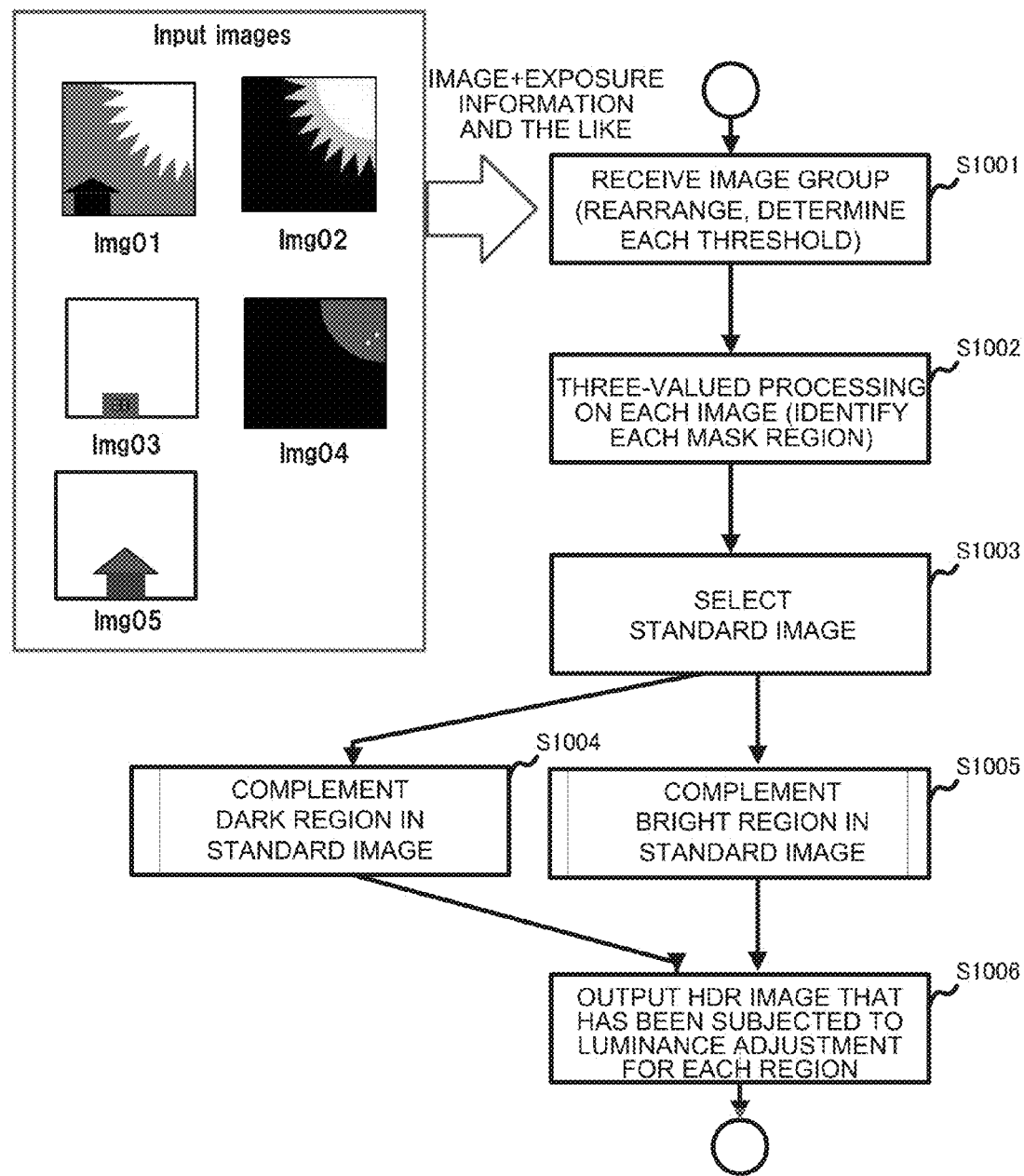
FIG. 10 is a flow chart for illustrating entire processing operation in one Example.

FIG. 10 is a flow chart for illustrating entire processing operation in one Example.

Figure 11:
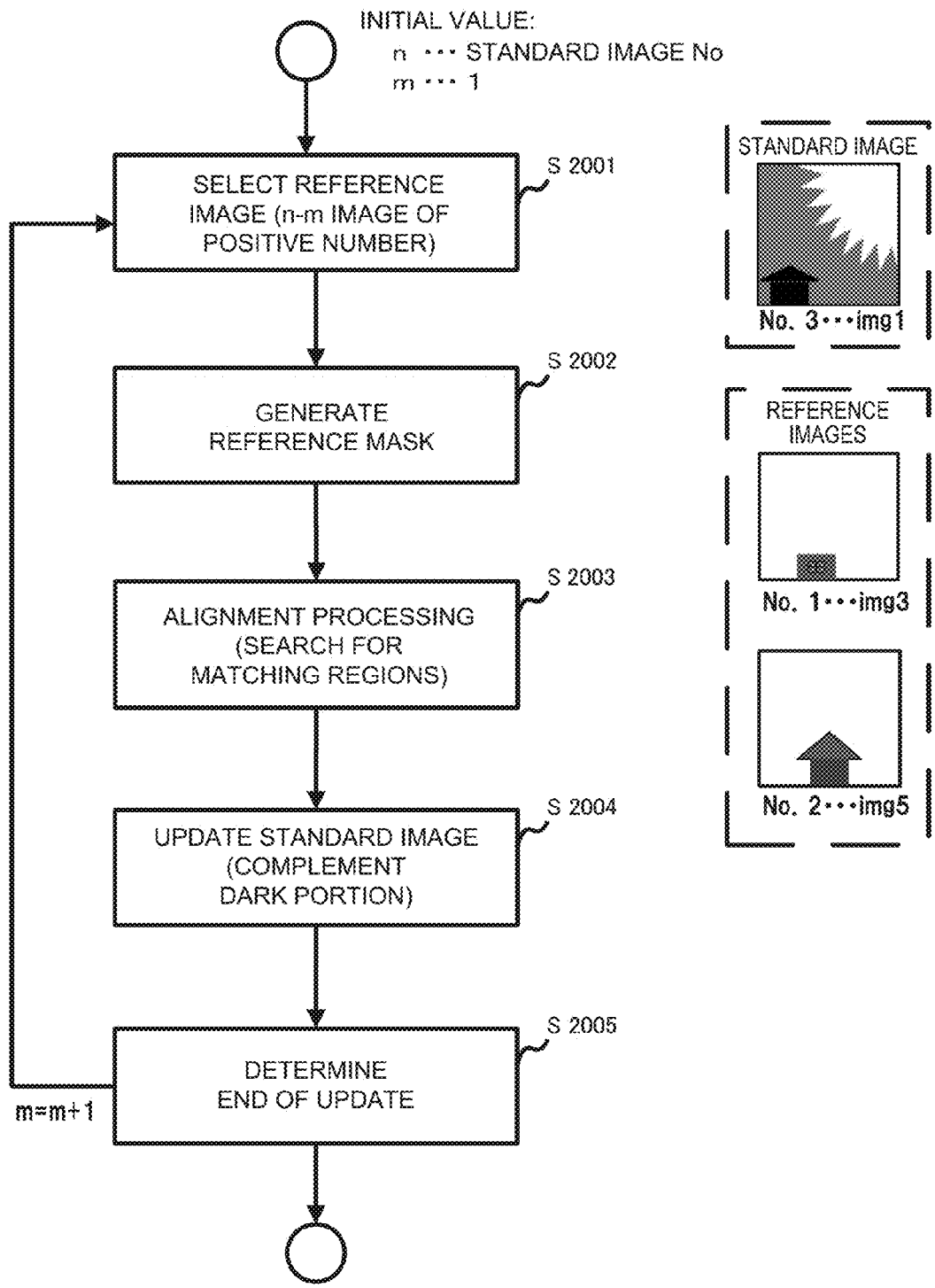
FIG. 11 is a flow chart for illustrating processing operation for complementing a dark region in the Example.

FIG. 11 is a flow chart for illustrating processing operation for complementing a dark region in the Example.

Figure 12:
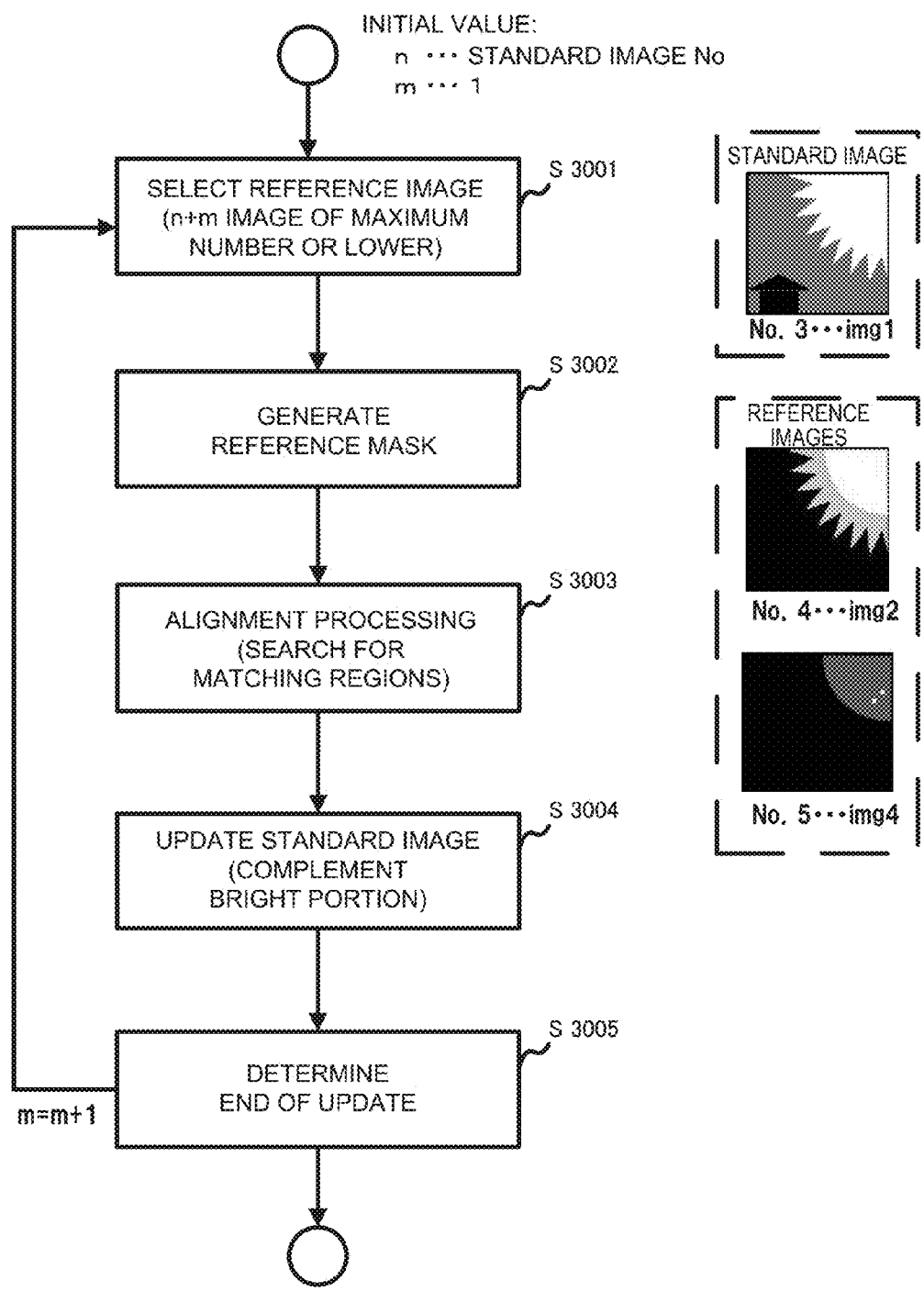
FIG. 12 is a flow chart for illustrating processing operation for complementing a bright region in the Example.

FIG. 12 is a flow chart for illustrating processing operation for complementing a bright region in the Example.

As illustrated in FIG. 10, an HDR image synthesis system (information processing apparatus) receives the plurality of images having the different luminance components, and adjusts the plurality of images as the input images (S1001). At this time, the input images are rearranged in order of luminance of the image group. A simple way may be to rearrange the input images in order of exposure time at the time of capturing the images and numbered from 1 to n. Alternatively, the input images may be ordered by average brightness or the like by the image analysis. Next, the thresholds with which the above-mentioned luminance component relationship among the images is established are determined among the numbered images. (The input images have the luminance component relationship in which the boundary luminance between the too bright region and the appropriately bright region of the luminance components in each image aligns with the boundary luminance between the appropriately bright region and the too dark region of the darker image having the adjacency relationship therewith in terms of luminance.)

The five images illustrated in FIG. 10 are input images obtained by capturing images having different exposures by a plurality of cameras. This image group is rearranged in order of decreasing exposure time as follows: Image 3→Image 5→Image 1→Image 2→Image 4. Note that, the position of the house is depicted at a different position for each image.

Next, the HDR image synthesis system generates each of three-valued images of the respective input images (S1002). In this conversion to the three-value image, the "too bright region", the "appropriately bright region", and the "too dark region" in each image are determined. The regions are set as a "too bright region mask", an "appropriately bright region mask", and a "too dark region mask", respectively. Each of the masks is superimposed on the original image and is information indicating a region that is not to be changed.

Next, the HDR image synthesis system refers to an amount of appropriate luminance regions or receives specification of the portion of the house or the like to select the standard image from among the input images (S1003).

At this time, each of regions (regions of the "too bright region mask" and the "too dark region mask") not masked by the "appropriately bright region mask" in the standard image is selected as the region to be complemented.

In other words, each of regions ("too bright region" and "too dark region") not corresponding to the "appropriately bright region" in the standard image is selected as the region to be complemented.

In this processing example, it is assumed that Image 1 is selected as the standard image.

Next, the HDR image synthesis system sequentially complements the regions of the "too bright region mask" and the "too dark region mask" in the standard image using images of the matching mask regions in the reference images (S1004), (S1005). This processing is described in detail with reference to FIG. 11 and FIG. 12.

Through the processing of searching for matching regions between the standard image and the reference image group, which is performed in the course of the processing, the different image pickup factors such as a shift in position of the subject appearing among the images (position of the house in this example) and the difference among the cameras are absorbed.

Finally, the HDR image synthesis system generates the synthetic image that has been subjected to the luminance adjustment for each region, and outputs the synthetic image as the HDR image (S1006).

Next, a processing operation example in which a dark region in the standard image is complemented is described with reference to FIG. 11. This processing is S1004 in FIG. 10.

First, the HDR image synthesis system (image synthesis unit) sets the standard image to "n", sets a reference image with which the matching is performed to "m=1", and selects one reference image to be compared with the standard image (S2001). Here, "n" is the number set in the above-mentioned numbering (in this example, "No. 3"), and the selected reference image is "No. 2". In the next turn, "No. 1" is set as the reference image. In FIG. 11, the standard image No. 3 (img1), the reference image No. 1 (img3), and a reference image No. 2 (img5) are illustrated.

Next, the HDR image synthesis system identifies masks in the selected reference image to generate a reference mask obtained by combining a region of the "too dark region mask" and the "appropriately bright region mask" (S2002). Through this processing, the roof and wall surface of the house (reference mask) obtained by combining a portion of the roof of the house (appropriately bright region mask) and the wall surface of the house (too dark region mask) in the figure is identified with reference to each region shape of the multivalue image. Note that, when there are a large number of regions in the image, the regions are used in combination as appropriate. Moreover, it is desired that regions far from each other be treated separately, and regions close to each other be treated as one group of regions.

Next, the HDR image synthesis system compares the "too dark region mask" in the standard image with the generated "reference mask", and with the individual "appropriately bright region masks" of the reference images as needed to search for matching regions (S2003). At this time, when matching is performed taking the texture into consideration, the robustness is improved.

Through this processing, the roof and wall surface of the house (too dark region mask) in the standard image matches with the roof and wall surface of the house (reference mask) in the reference image.

Note that, three-valued or higher multivalued images may be used to give ambiguity to the boundary portion in terms of luminance, with the result that the matching accuracy is improved.

Next, the HDR image synthesis system overwrites or synthesizes the matching "too dark region" in the standard image using textures of the "reference mask" in the reference image in this turn or the individual "appropriately bright region masks" of the reference images to update the standard image (S2004).

Through this processing, the roof and wall surface of the house (too dark region mask) in the standard image is overwritten or synthesized with the roof and wall surface of the house (reference mask) in the reference image.

Next, the HDR image synthesis system ends the processing of complementing the dark region when there is no more "too dark region" in the updated standard image or "m" is the maximum possible value, and returns to S2001 to select the next reference image when there is still a reference image to be used (S2005).

In the next turn, the wall surface (reference mask) in the image No. 1 is integrated in the standard image.

As a result, one or a plurality of images (reference images) that are different in depiction of the position may be used to perform the complementary processing on the image portions in the original image, which correspond to the "too dark regions" in the correction image of the standard image using the image portions, which are matching regions in the reference images and correspond to the "appropriately bright regions" in each of the reference images.

Next, a processing operation example in which a bright region in the standard image is complemented is described with reference to FIG. 12. This processing is S1005 in FIG. 10.

First, the HDR image synthesis system (image synthesis unit) sets the standard image to "n", sets the reference image with which the matching is performed to "m=1", and selects one reference image to be compared with the standard image (S3001). Here, "n" is the number set in the above-mentioned numbering (in this example, "No. 3"), and the selected reference image is "No. 4". In the next turn. "No. 5" is selected as the reference image. In FIG. 12, the standard image No. 3 (img1), the reference image No. 4 (img2), and the reference image No. 5 (img4) are illustrated.

Next, the HDR image synthesis system identifies masks in the selected reference image to generate a reference mask obtained by combining a region of the "too bright region mask" and the "appropriately bright region mask" (S3002). Through this processing, the surroundings of the sun (reference mask) obtained by combining the sun (too bright region mask) and the outer extending portion (appropriately bright region mask) in the figure are identified with reference to each region shape of the multivalue image. Note that, when there are a large number of regions in the image, the regions are used in combination as appropriate. Moreover, it is desired that regions far from each other be treated separately, and regions close to each other be treated as one group of regions.

Next, the HDR image synthesis system compares the "too bright region mask" in the standard image with the generated "reference mask", and with the individual "appropriately bright region masks" of the reference images as needed to search for matching regions (S3003). At this time, when the matching is performed taking the texture into consideration, the accuracy is improved.

Through this processing, the surroundings of the sun (too bright region mask) in the standard image match with the surroundings of the sun (reference mask) in the reference image.

Note that, the three-valued or higher multivalued images may be used to give ambiguity to the boundary portion in terms of luminance, with the result that the robustness in matching is improved.

Next, the HDR image synthesis system overwrites or synthesizes the matching "too bright region" in the standard image using textures of the "reference mask" in the reference image in this turn or the individual "appropriately bright region masks" in the reference images to update the standard image (S3004).

Through this processing, the surroundings of the sun (too bright region mask) in the standard image are overwritten or synthesized with the surroundings of the sun (reference mask) in the reference image.

Next, the HDR image synthesis system ends the processing of complementing the bright region when there is no more "too bright region" in the updated standard image or "m" is the maximum possible value, and returns to S3001 to select the next reference image when there is still a reference image to be used (S3005).

In the next turn, the inner surface of the sun (reference mask) in the image No. 5 is integrated in the standard image.

As a result, the one or a plurality of images (reference images) that are different in depiction of the position may be used to perform the complementary processing on the image portions in the original image, which correspond to the "too bright regions" in the correction image of the standard image, using the image portions, which are matching regions in the reference images and correspond to the "appropriately bright regions" in each of the reference images.

Figure 13:
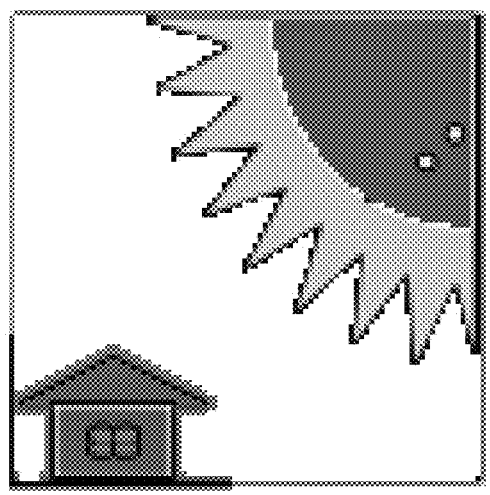
FIG. 13 is a diagram for showing an example image generated by the entire processing operation illustrated in FIG. 10.

By subjecting the image portions corresponding to the too bright region and the too dark region in the correction image of the standard image exemplified above to the complementary processing using the image portions, which are matching regions in the reference images and correspond to the appropriately bright regions in each of the reference images, the HDR image synthesis system may generate the HDR image as shown in FIG. 13.

As described above, according to the image processing system of this invention, the plurality of images having features in the luminance relationship are received as the inputs, and the high dynamic range image may be obtained as desired even when the image pickup factors such as the pixel pickup positions and times are different.

This is because the processing is performed in which parts of the reference images that match the regions that need to be complemented in the standard image are searched for, and in which the partial images obtained as the search result are used to complement the regions that need to be complemented in the standard image using the images of the appropriately bright regions in the reference images.

Figure 14:
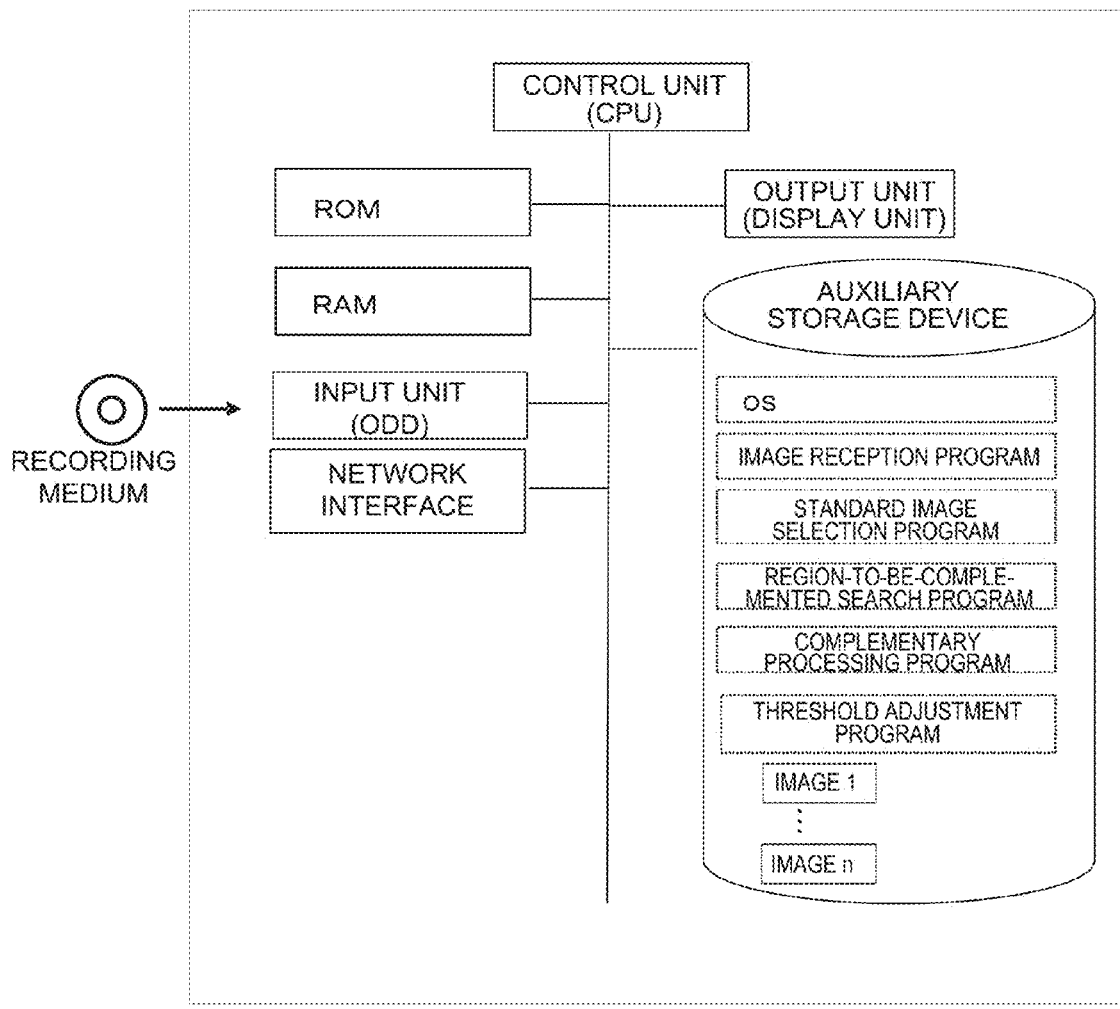
FIG. 14 is a block diagram for illustrating an HDR image synthesis system according to the Example.

Note that, the respective units of the image processing system may be realized using a combination of hardware and software. In an embodiment in which hardware and software are combined, as illustrated in FIG. 14, an image processing program is deployed on a random access memory (RAM), and hardware such as a control unit (central processing unit (CPU)) is caused to operate based on the program to function as all or a part of means of the image reception unit, the standard image selection unit, the region-to-be-complemented search unit, the complementary processing unit, and the output unit. Alternatively, this program may be fixedly recorded and distributed on a recording medium. The program recorded on the recording medium is read to the memory by wire, wirelessly, or via the recording medium itself to cause the control unit and the like to operate. Note that, examples of the recording medium include an optical disc, a magnetic disk, a semiconductor memory device, a hard disk, and the like. Moreover, all or a part of the units may be formed by constructing a circuit on an LSI.

The specific structure of this invention is not limited to the above-mentioned embodiments, and modifications without departing from the spirit of this invention, such as separation and combination of block components, interchange of the procedures, and combination of the embodiments, are encompassed within this invention.

Moreover, a part or all of the above-mentioned embodiments may be described as follows. Note that, Supplementary Notes provided below are not intended to limit this invention in any way.

[Supplementary Note 1]

An image processing system, including:

an image reception unit configured to receive a plurality of images having different luminance components as input images:

a standard image selection unit configured to select a standard image from among the plurality of images:

a region-to-be-complemented search unit configured to perform, in extracting partial images for complementing a too bright region and/or too dark region in the standard image using other images of the plurality of images as reference images from the reference images, processing of searching, using correction images obtained by subjecting each of the input images to multivalued processing for each division of the luminance components, for regions having matching shapes using shapes of dividable regions included in the correction image of the standard image and shapes of dividable regions included in the correction images of the other images;

a complementary processing unit configured to subject image portions corresponding to the too bright region and/or too dark region in the correction image of the standard image to complementary processing using image portions, which are matching regions in the reference images and correspond to appropriately bright regions in each of the reference images, to thereby generate a synthetic image; and an output unit configured to output the generated synthetic image, in which, as the input images, each image is dividable into at least three values: a bright region, an appropriately bright region, and a dark region, and an image group having a luminance component relationship in which a boundary luminance between the bright region and the appropriately bright region of luminance components in each image aligns with a boundary luminance between the appropriately bright region and the dark region in a darker image having an adjacency relationship therewith in terms of luminance is used.

[Supplementary Note 2]

The image processing system according to the above-mentioned supplementary note, in which the standard image selection unit is configured to perform, in selecting the standard image, based on an area of the appropriately bright region in an entirety or a predetermined range of each image, processing of selecting one or a plurality of higher-order images having large areas as the standard image.

[Supplementary Note 3]

The image processing system according to the above-mentioned supplementary notes, in which the region-to-be-complemented search unit is configured to perform, in performing the search processing, using the correction images categorized into three divisions indicating a bright region, an appropriately bright region, and a dark region, matching processing on shapes of dividable regions including the appropriately bright region included in a correction image of an image having an adjacency relationship in terms of luminance with reference to shapes of the too bright region and/or too dark region included in the correction image of the standard image to extract the partial images in the reference images, which are used for complementing, from the reference images.

[Supplementary Note 4]

The image processing system according to the above-mentioned supplementary notes, in which, in repeatedly executing the search processing and the complementary processing using a plurality of reference images, the search processing and the complementary processing are repeated while complementing the standard image using a reference image having an adjacency relationship in terms of luminance with the standard image, and then filling the too bright region and/or too dark region in the standard image so that the complemented standard image is further complemented using a next reference image having a adjacency relationship in terms of luminance.

[Supplementary Note 5]

The image processing system according to the above-mentioned supplementary notes, in which, in repeatedly executing the search processing and the complementary processing using a plurality of reference images, the search processing and the complementary processing are repeated while complementing the standard image using a reference image farthest from the standard image in terms of luminance, and then filling the too bright region and/or too dark region in the standard image so that the complemented standard image is further complemented using a reference image next farthest from the standard image in terms of luminance.

[Supplementary Note 6]

The image processing system according to the above-mentioned supplementary notes, in which, in repeatedly executing the search processing and the complementary processing using a plurality of reference images, through search processing between reference images having an adjacency relationship in terms of luminance, a too bright region and/or too dark region in each of the reference images is complemented with other reference images, and then the standard image is complemented using a reference image having an adjacency relationship with the standard image in terms of luminance.

[Supplementary Note 7]

The image processing system according to the above-mentioned supplementary notes, in which, in the complementary processing, in a region in which the standard image has been complemented using a reference image, image portions corresponding to the too bright region and/or too dark region in a correction image of the reference image used in the complementing are complemented using regions that have been successfully matched using remaining reference images.

[Supplementary Note 8]

The image processing system according to the above-mentioned supplementary notes, in which, in repeatedly executing the search processing and the complementary processing using a plurality of reference images, the search processing and the complementary processing are repeated on the image portions corresponding to the too bright region and/or too dark region in the selected standard image, which need to be complemented, separately for reference images for filling the too bright region and/or too dark region in order of use from a reference image close to the standard image in terms of luminance to a reference image farther from the standard image.

[Supplementary Note 9]

The image processing system according to the above-mentioned supplementary notes, in which:

luminance adjustment processing is applied to each of partial images for each region acquired from each of the reference images; and each of the partial images of the regions that have been subjected to luminance adjustment is complemented after the image portions corresponding to the too bright region and/or too dark region in the standard image are subjected to the luminance adjustment of a part of the appropriately bright region.

[Supplementary Note 10]

The image processing system according to the above-mentioned supplementary notes, in which an image content of an image portion, which is a region in the reference image that matches the standard image and corresponds to the appropriately bright region in each of the reference images, is referenced to search for regions that match all or a part of the remaining reference images.

[Supplementary Note 11]

The image processing system according to the above-mentioned supplementary notes, in which, in searching for a matching region between the reference images and the standard image, the following cost function (1) is satisfied to search for the matching region in the reference images:

$$E_\Omega(p) = E_{shape}(p) + \alpha E_{texture}(p) \qquad (1),$$

where:

$E_\Omega(p)$ is a total matching cost of individual luminance region shapes;

$E_{shape}(p)$ is a part of the cost function for searching with exclusive disjunction;

$E_{texture}(p)$ is a part of the cost function for searching with weighted SSD; and $\alpha$ is a weight variable.

[Supplementary Note 12]

The image processing system according to the above-mentioned supplementary notes, in which, in searching for a matching region between the reference images and the standard image, the following cost function (4) is satisfied to search for the matching region in the reference images:

$$E(p_1, \ldots, p_N) = \sum_{k=1}^{N} |\Omega_k| \qquad (4)$$

$$(E_{shape}(p_k) + \alpha E_{texture}(p_k)) + \lambda \sum_{(i,j) \in E} w_d(\Omega_i, \Omega_j) \| p_i - p_j \|^2$$

where:

$E_\Omega(p_1, \ldots, p_N)$ is a total cost of all combinations of pairs of each luminance region shape;

$E_{shape}(p_k)$ is a part of the cost function for searching with exclusive disjunction;

$E_{texture}(p_k)$ is a part of the cost function for searching with weighted SSD;

α is a weight variable:

λ is a magnitude of a smoothness term regarding a shift p of each luminance region shape; and $\omega_d(\Omega_i, \Omega_j)$ is a weight indicating a strength of the smoothness term of a luminance region shape i and a luminance region shape j.

[Supplementary Note 13]

The image processing system according to the above-mentioned supplementary notes, in which, in the search processing, a plurality of extracted regions having a predetermined approximate relationship in which divisions of the luminance components are the same are treated as one or a plurality of groups.

[Supplementary Note 14]

The image processing system according to the above-mentioned supplementary notes, in which the plurality of images are received to receive the input images, and the input images are rearranged in order of luminance and thresholds with which the luminance component relationship is established are determined among the images so that the luminance component relationship among the input images is satisfied.

[Supplementary Note 15]

An image processing method using an information processing system, including:

receiving a plurality of images having different luminance components as input images;

selecting a standard image from among the plurality of images;

performing, in extracting partial images for complementing a too bright region and/or too dark region in the standard image using other images in the plurality of images as reference images from the reference images, processing of searching, using correction images obtained by subjecting each of the input images to multivalued processing for each division of luminance components, for regions having matching shapes using shapes of dividable regions included in the correction image of the standard image and shapes of dividable regions included in the correction images of the other images; and subjecting image portions corresponding to the too bright region and/or too dark region in the correction image of the standard image to complementary processing using image portions, which are matching regions in the reference images and correspond to appropriately bright regions in each of the reference images, to thereby generate a synthetic image, in which, as the input images, each image is dividable into at least three values: a too bright region, an appropriately bright region, and a too dark region, and an image group having a luminance component relationship in which a boundary luminance between the too bright region and the appropriately bright region of the luminance components in each image aligns with a boundary luminance between the appropriately bright region and the too dark region in a darker image having an adjacency relationship therewith in terms of luminance is used.

[Supplementary Note 16]

The image processing method according to the above-mentioned supplementary note, in which the image processing system is configured to perform, in selecting the standard image, based on an area of the appropriately bright region in an entirety or a predetermined range of each image, processing of selecting one or a plurality of higher-order images having large areas as the standard image.

[Supplementary Note 17]

The image processing method according to the above-mentioned supplementary notes, in which the image processing system is configured to perform, in performing the search processing, using the correction images categorized into three divisions indicating a bright region, an appropriately bright region, and a dark region, matching processing on shapes of dividable regions including the appropriately bright region included in a correction image of an image having an adjacency relationship in terms of luminance with reference to shapes of the too bright region and/or too dark region included in the correction image of the standard image to extract the partial images in the reference images, which are used for complementing, from the reference images.

[Supplementary Note 18]

The image processing method according to the above-mentioned supplementary notes, in which the image processing system is configured to repeat, in repeatedly executing the search processing and the complementary processing using a plurality of reference images, the search processing and the complementary processing while complementing the standard image using a reference image having an adjacency relationship in terms of luminance with the standard image, and then filling the too bright region and/or too dark region in the standard image so that the complemented standard image is further complemented using a next reference image having a adjacency relationship in terms of luminance.

[Supplementary Note 19]

The image processing method according to the above-mentioned supplementary notes, in which the image processing system is configured to repeat, in repeatedly executing the search processing and the complementary processing using a plurality of reference images, the search processing and the complementary processing while complementing the standard image using a reference image farthest from the standard image in terms of luminance, and then filling the too bright region and/or too dark region in the standard image so that the complemented standard image is further complemented using a reference image next farthest from the standard image in terms of luminance.

[Supplementary Note 20]

The image processing method according to the above-mentioned supplementary notes, in which the image processing system is configured to complement, in repeatedly executing the search processing and the complementary processing using a plurality of reference images, through search processing between reference images having an adjacency relationship in terms of luminance, a too bright region and/or too dark region in each of the reference images with other reference images, and then complement the standard image using a reference image having an adjacency relationship with the standard image in terms of luminance.

[Supplementary Note 21]

The image processing method according to the above-mentioned supplementary notes, in which the image processing system is configured to complement, in the complementary processing, in a region in which the standard image has been complemented using a reference image, image portions corresponding to the too bright region and/or too dark region in a correction image of the reference image used in the complementing using regions that have been successfully matched using remaining reference images.

[Supplementary Note 22]

The image processing method according to the above-mentioned supplementary notes, in which the image processing system is configured to repeat, in repeatedly executing the search processing and the complementary processing using a plurality of reference images, the search processing and the complementary processing on the image portions corresponding to the too bright region and/or too dark region in the selected standard image, which need to be complemented, separately for reference images for filling the too bright region and/or too dark region in order of use from a reference image close to the standard image in terms of luminance to a reference image farther from the standard image.

[Supplementary Note 23]

The image processing method according to the above-mentioned supplementary notes, in which the image processing system is configured to:

apply luminance adjustment processing to each of partial images for each region acquired from each of the reference images; and complement each of the partial images of the regions that have been subjected to luminance adjustment after the image portions corresponding to the too bright region and/or too dark region in the standard image are subjected to the luminance adjustment of a part of the appropriately bright region.

[Supplementary Note 24]

The image processing method according to the above-mentioned supplementary notes, in which the image processing system is configured to refer to an image content of an image portion, which is a region in the reference image that matches the standard image and corresponds to the appropriately bright region in each of the reference images, to search for regions that match all or a part of the remaining reference images.

[Supplementary Note 25]

The image processing method according to the above-mentioned supplementary notes, in which the image processing system is configured to satisfy, in searching for a matching region between the reference images and the standard image, the following cost function (1) to search for the matching region in the reference images:

$$E_\Omega(p) = E_{shape}(p) + \alpha E_{texture}(p) \quad (1),$$

where:

$E_\Omega(p)$ is a total matching cost of individual luminance region shapes;

$E_{shape}(p)$ is a part of the cost function for searching with exclusive disjunction;

$E_{texture}(p)$ is a part of the cost function for searching with weighted SSD; and α is a weight variable.

[Supplementary Note 26]

The image processing method according to the above-mentioned supplementary notes, in which the image processing system is configured to satisfy, in searching for a matching region between the reference images and the standard image, the following cost function (4) to search for the matching region in the reference images:

$$E(p_1, \ldots, p_N) = \sum_{k=1}^{N} |\Omega_k|$$
$$(E_{shape}(p_k) + \alpha E_{texture}(p_k)) + \lambda \sum_{(i,j) \in E} w_d(\Omega_i, \Omega_j) \| p_i - p_j \|^2 \quad (4)$$

where:

$E_\Omega(p_1, \ldots, p_N)$ is a total cost of all combinations of pairs of each luminance region shape;

$E_{shape}(p_k)$ is a part of the cost function for searching with exclusive disjunction;

$E_{texture}(p_k)$ is a part of the cost function for searching with weighted SSD;

α is a weight variable;

λ is a magnitude of a smoothness term regarding a shift p of each luminance region shape; and $\omega_d(\Omega_i, \Omega_j)$ is a weight indicating a strength of the smoothness term of a luminance region shape i and a luminance region shape j.

[Supplementary Note 27]

The image processing method according to the abovementioned supplementary notes, in which the image processing system is configured to treat, in the search processing, a plurality of extracted regions having a predetermined approximate relationship in which divisions of the luminance components are the same as one or a plurality of groups.

[Supplementary Note 28]

The image processing method according to the abovementioned supplementary notes, in which the image processing system is configured to receive the plurality of images to receive the input images, and to rearrange the input images in order of luminance and determine thresholds with which the luminance component relationship is established among the images so that the luminance component relationship among the input images is satisfied.

[Supplementary Note 29]

A program for causing an information processing system to operate as:

an image reception unit configured to receive a plurality of images having different luminance components as input images;

a standard image selection unit configured to select a standard image from among the plurality of images;

a region-to-be-complemented search unit configured to perform, in extracting partial images for complementing a too bright region and/or too dark region in the standard image using other images in the plurality of images as reference images from the reference images, processing of searching, using correction images obtained by subjecting each of the input images to multivalued processing for each division of luminance components, for regions having matching shapes using shapes of dividable regions included in the correction image of the standard image and shapes of dividable regions included in the correction images of the other images;

a complementary processing unit configured to subject image portions corresponding to the too bright region and/or too dark region in the correction image of the standard image to complementary processing using image portions, which are matching regions in the reference images and correspond to appropriately bright regions in each of the reference images, to thereby generate a synthetic image; and an output unit configured to output the generated synthetic image, in which, as conditions for the input images, each image is dividable into at least three values: a bright region, an appropriately bright region, and a dark region, and an image group having a luminance component relationship in which a boundary luminance between the bright region and the appropriately bright region of luminance components in each image aligns with a boundary luminance between the appropriately bright region and the dark region in a darker image having an adjacency relationship therewith in terms of luminance is used.

[Supplementary Note 30]

The program according to the above-mentioned supplementary note, in which the program causes the standard image selection unit to operate so as to perform, in selecting the standard image, based on an area of the appropriately bright region in an entirety or a predetermined range of each image, processing of selecting one or a plurality of higher-order images having large areas as the standard image.

[Supplementary Note 31]

The program according to the above-mentioned supplementary notes, in which the program causes the region-to-be-complemented search unit to operate so as to perform, in performing the search processing, using the correction images categorized into three divisions indicating a bright region, an appropriately bright region, and a dark region, matching processing on shapes of dividable regions including the appropriately bright region included in a correction image of an image having an adjacency relationship in terms of luminance with reference to shapes of the too bright region and/or too dark region included in the correction image of the standard image to extract the partial images in the reference images, which are used for complementing, from the reference images.

[Supplementary Note 32]

The program according to the above-mentioned supplementary notes, in which the program causes the information processing system to operate so as to repeat, in repeatedly executing the search processing and the complementary processing using a plurality of reference images, the search processing and the complementary processing while complementing the standard image using a reference image having an adjacency relationship in terms of luminance with the standard image, and then filling the too bright region and/or too dark region in the standard image so that the complemented standard image is further complemented using a next reference image having a adjacency relationship in terms of luminance.

[Supplementary Note 33]

The program according to the above-mentioned supplementary notes, in which the program causes the information processing system to operate so as to repeat, in repeatedly executing the search processing and the complementary processing using a plurality of reference images, the search processing and the complementary processing while complementing the standard image using a reference image farthest from the standard image in terms of luminance, and then filling the too bright region and/or too dark region in the standard image so that the complemented standard image is further complemented using a reference image next farthest from the standard image in terms of luminance.

[Supplementary Note 34]

The program according to the above-mentioned supplementary notes, in which the program causes the information processing system to operate so as to complement, in repeatedly executing the search processing and the complementary processing using a plurality of reference images, through search processing between reference images having an adjacency relationship in terms of luminance, a too bright region and/or too dark region in each of the reference images with other reference images, and then complement the standard image using a reference image having an adjacency relationship with the standard image in terms of luminance.

[Supplementary Note 35]

The program according to the above-mentioned supplementary notes, in which the program causes the information processing system to operate so as to complement, in the complementary processing, in a region in which the standard image has been complemented using a reference image, image portions corresponding to the too bright region and/or too dark region in a correction image of the reference image used in the complementing using regions that have been successfully matched using remaining reference images.

[Supplementary Note 36]

The program according to the above-mentioned supplementary notes, in which the program causes the information processing system to operate so as to repeat, in repeatedly executing the search processing and the complementary processing using a plurality of reference images, the search processing and the complementary processing on the image portions corresponding to the too bright region and/or too dark region in the selected standard image, which need to be complemented, separately for reference images for filling the too bright region and/or too dark region in order of use from a reference image close to the standard image in terms of luminance to a reference image farther from the standard image.

[Supplementary Note 37]

The program according to the above-mentioned supplementary notes, in which the program causes the information processing system to operate so as to:

apply luminance adjustment processing to each of partial images for each region acquired from each of the reference images; and complement each of the partial images of the regions that have been subjected to luminance adjustment after the image portions corresponding to the too bright region and/or too dark region in the standard image are subjected to the luminance adjustment of a part of the appropriately bright region.

[Supplementary Note 38]

The program according to the above-mentioned supplementary notes, in which the program causes the information processing system to operate so as to refer to an image content of an image portion, which is a region in the reference image that matches the standard image and corresponds to the appropriately bright region in each of the reference images, to search for regions that match all or a part of the remaining reference images.

[Supplementary Note 39]

The program according to the above-mentioned supplementary notes, in which the program causes the information processing system to operate so as to satisfy, in searching for a matching region between the reference images and the standard image, the following cost function (1) to search for the matching region in the reference images:

$$E_\Omega(p) = E_{shape}(p) + \alpha E_{texture}(p) \tag{1},$$

where:

$E_\Omega(p)$ is a total matching cost of individual luminance region shapes;

$E_{shape}(p)$ is a part of the cost function for searching with exclusive disjunction;

$E_{texture}(p)$ is a part of the cost function for searching with weighted SSD; and $\alpha$ is a weight variable.

[Supplementary Note 40]

The program according to the above-mentioned supplementary notes, in which the program causes the information processing system to operate so as to satisfy, in searching for a matching region between the reference images and the standard image, the following cost function (4) to search for the matching region in the reference images:

$$E(p_1, \ldots, p_N) = \sum_{k=1}^{N} |\Omega_k| \quad (4)$$

$$(E_{shape}(p_k) + \alpha E_{texture}(p_k)) + \lambda \sum_{(i,j) \in E} w_d(\Omega_i, \Omega_j) \| p_i - p_j \|^2$$

where:

$E_\Omega(p_1, \ldots, p_N)$ is a total cost of all combinations of pairs of each luminance region shape;

$E_{shape}(p_k)$ is a part of the cost function for searching with exclusive disjunction;

$E_{texture}(p_k)$ is a part of the cost function for searching with weighted SSD;

α is a weight variable;

λ is a magnitude of a smoothness term regarding a shift p of each luminance region shape; and $\omega_d(\Omega_i, \Omega_j)$ is a weight indicating a strength of the smoothness term of a luminance region shape i and a luminance region shape j.

[Supplementary Note 41]

The program according to the above-mentioned supplementary notes, in which the program causes the information processing system to operate so as to treat, in the search processing, a plurality of extracted regions having a predetermined approximate relationship in which divisions of the luminance components are the same as one or a plurality of groups.

[Supplementary Note 42]

The program according to the above-mentioned supplementary notes, in which the program causes the information processing system to operate so as to receive the plurality of images to receive the input images, and to rearrange the input images in order of luminance and determine thresholds with which the luminance component relationship is established among the images so that the luminance component relationship among the input images is satisfied.

[Supplementary Note 43]

A computer-readable recording medium having the program of the above-mentioned supplementary notes non-temporarily recorded thereon.

This application claims priority based on Japanese Patent Application No. 2013-235787, filed on Nov. 14, 2013, the entire disclosure of which is incorporated herein.

REFERENCE SIGNS LIST

1 HDR image synthesis system
10 image reception unit (image reception means)
20 standard image selection unit (standard image selection means)
30 region-to-be-completed search unit (region-to-be-completed search means)
40 complementary processing unit (complementary processing means)
50 output unit (output means)

The invention claimed is:

1. An image processing system, comprising:
an image reception unit configured to receive a plurality of images having different luminance components as input images;
a standard image selection unit configured to select a standard image from among the plurality of images;
a region-to-be-complemented search unit configured to perform, in extracting partial images for complementing a too bright region and/or too dark region in the standard image using other images of the plurality of images as reference images from the reference images, processing of searching, using correction images obtained by subjecting each of the input images to multivalued processing for each division of the luminance components, for regions having matching shapes using shapes of dividable regions included in the correction image of the standard image and shapes of dividable regions included in the correction images of the other images;
a complementary processing unit configured to subject image portions corresponding to the too bright region and/or too dark region in the correction image of the standard image to complementary processing using image portions, which are matching regions in the reference images and correspond to appropriately bright regions in each of the reference images, to thereby generate a synthetic image; and
an output unit configured to output the generated synthetic image,
wherein, as the input images, each image is dividable into at least three values: a bright region, an appropriately bright region, and a dark region, and an image group having a luminance component relationship in which a boundary luminance between the bright region and the appropriately bright region of luminance components in each image aligns with a boundary luminance between the appropriately bright region and the dark region in a darker image having an adjacency relationship therewith in terms of luminance is used.

2. An image processing system according to claim 1, wherein the standard image selection unit is configured to perform, in selecting the standard image, based on an area of the appropriately bright region in an entirety or a predetermined range of each image, processing of selecting one or a plurality of higher-order images having large areas as the standard image.

3. An image processing system according to claim 1, wherein the region-to-be-complemented search unit is configured to perform, in performing the search processing, using the correction images categorized into three divisions indicating a bright region, an appropriately bright region, and a dark region, matching processing on shapes of dividable regions including the appropriately bright region included in a correction image of an image having an adjacency relationship in terms of luminance with reference to shapes of the too bright region and/or too dark region included in the correction image of the standard image to extract the partial images in the reference images, which are used for complementing, from the reference images.

4. An image processing system according to claim 1, wherein, in repeatedly executing the search processing and the complementary processing using a plurality of reference images, the search processing and the complementary processing are repeated while complementing the standard image using a reference image having an adjacency relationship in terms of luminance with the standard image, and then filling the too bright region and/or too dark region in the standard image so that the complemented standard image is further complemented using a next reference image having a adjacency relationship in terms of luminance.

5. An image processing system according to claim 1, wherein an image content of an image portion, which is a region in the reference image that matches the standard image and corresponds to the appropriately bright region in each of the reference images, is referenced to search for regions that match all or a part of the remaining reference images.

6. An image processing system according to claim 1, wherein, in searching for a matching region between the reference images and the standard image, the following cost function (1) is satisfied to search for the matching region in the reference images:

$$E_\Omega(p) = E_{shape}(p) + \alpha E_{texture}(p) \quad (1),$$

where:
- $E_\Omega(p)$ is a total matching cost of individual luminance region shapes;
- $E_{shape}(p)$ is a part of the cost function for searching with exclusive disjunction;
- $E_{texture}(p)$ is a part of the cost function for searching with weighted SSD; and
- $\alpha$ is a weight variable.

7. An image processing system according to claim 1, wherein, in the search processing, a plurality of extracted regions having a predetermined approximate relationship in which divisions of the luminance components are the same are treated as one or a plurality of groups.

8. An image processing system according to claim 1, wherein the plurality of images are received to receive the input images, and the input images are rearranged in order of luminance and thresholds with which the luminance component relationship is established are determined among the images so that the luminance component relationship among the input images is satisfied.

9. An image processing method using an information processing system, including:
receiving a plurality of images having different luminance components as input images;
selecting a standard image from among the plurality of images;
performing, in extracting partial images for complementing a too bright region and/or too dark region in the standard image using other images in the plurality of images as reference images from the reference images, processing of searching, using correction images obtained by subjecting each of the input images to multivalued processing for each division of luminance components, for regions having matching shapes using shapes of dividable regions included in the correction image of the standard image and shapes of dividable regions included in the correction images of the other images; and
subjecting image portions corresponding to the too bright region and/or too dark region in the correction image of the standard image to complementary processing using image portions, which are matching regions in the reference images and correspond to appropriately bright regions in each of the reference images, to thereby generate a synthetic image,
wherein, as the input images, each image is dividable into at least three values: a too bright region, an appropriately bright region, and a too dark region, and an image group having a luminance component relationship in which a boundary luminance between the too bright region and the appropriately bright region of the luminance components in each image aligns with a boundary luminance between the appropriately bright region and the too dark region in a darker image having an adjacency relationship therewith in terms of luminance is used.

10. A computer-readable recording medium having non-temporarily recorded thereon a program for causing an information processing system to operate as:
an image reception unit configured to receive a plurality of images having different luminance components as input images;
a standard image selection unit configured to select a standard image from among the plurality of images;
a region-to-be-complemented search unit configured to perform, in extracting partial images for complementing a too bright region and/or too dark region in the standard image using other images in the plurality of images as reference images from the reference images, processing of searching, using correction images obtained by subjecting each of the input images to multivalued processing for each division of luminance components, for regions having matching shapes using shapes of dividable regions included in the correction image of the standard image and shapes of dividable regions included in the correction images of the other images;
a complementary processing unit configured to subject image portions corresponding to the too bright region and/or too dark region in the correction image of the standard image to complementary processing using image portions, which are matching regions in the reference images and correspond to appropriately bright regions in each of the reference images, to thereby generate a synthetic image; and
an output unit configured to output the generated synthetic image,
wherein, as conditions for the input images, each image is dividable into at least three values: a bright region, an appropriately bright region, and a dark region, and an image group having a luminance component relationship in which a boundary luminance between the bright region and the appropriately bright region of luminance components in each image aligns with a boundary luminance between the appropriately bright region and the dark region in a darker image having an adjacency relationship therewith in terms of luminance is used.

* * * * *